US011070644B1

(12) United States Patent
Teng et al.

(10) Patent No.: US 11,070,644 B1
(45) Date of Patent: Jul. 20, 2021

(54) RESOURCE GROUPED ARCHITECTURE FOR PROFILE SWITCHING

(71) Applicant: Amazon Technologies, Inc., Seattle, WA (US)

(72) Inventors: Da Teng, Sammamish, WA (US); Farah Shariff, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/914,661

(22) Filed: Jun. 29, 2020

(51) Int. Cl.
*H04L 29/08* (2006.01)

(52) U.S. Cl.
CPC .................... *H04L 67/306* (2013.01)

(58) Field of Classification Search
CPC ... H04L 67/30; H04L 67/306; G06F 9/44505; G06F 16/9535
See application file for complete search history.

(56) References Cited

U.S. PATENT DOCUMENTS

| 9,813,373 | B2* | 11/2017 | Zhang | G06Q 10/10 |
| 10,580,405 | B1* | 3/2020 | Wang | G10L 17/22 |
| 10,769,101 | B2* | 9/2020 | Goenka | H04L 51/22 |
| 10,812,583 | B2* | 10/2020 | Wang | G06Q 50/01 |
| 10,880,398 | B2* | 12/2020 | Li | G06Q 20/223 |
| 10,902,001 | B1* | 1/2021 | Rengasamy | H04L 67/141 |
| 2006/0136561 | A1* | 6/2006 | Lee | H04L 29/1216 709/206 |
| 2015/0215261 | A1* | 7/2015 | Zhang | H04L 51/16 709/206 |
| 2016/0335679 | A1* | 11/2016 | Kshirsagar | H04W 12/06 |
| 2018/0189352 | A1* | 7/2018 | Ghafourifar | G06F 9/451 |
| 2018/0295208 | A1* | 10/2018 | Li | G06Q 20/3223 |
| 2021/0034386 | A1* | 2/2021 | Ghafourifar | G06F 16/9535 |

FOREIGN PATENT DOCUMENTS

| CN | 103338248 A | * | 10/2013 |
| CN | 103338248 B | * | 7/2015 |
| CN | 105321073 A | * | 2/2016 |

* cited by examiner

*Primary Examiner* — Kostas J Katsikis
(74) *Attorney, Agent, or Firm* — Pierce Atwood LLP

(57) ABSTRACT

Techniques for improving profile switching and/or account switching using resource grouped architecture. For example, a system may group multiple applications and/or features together and associate them with a container that includes a set of resources shared between the features. Thus, all of the applications/features in a container may use the same set of resources, which enables the system to update the resources for multiple features at a time. In addition, the system may maintain multiple containers simultaneously, enabling the system to perform profile/account switching by moving an individual application/feature from a first container to a second container. Thus, this resource grouped architecture simplifies profile/account switching and enables additional functionality for care givers. For example, the system may associate some applications/features with a care giver profile/account and other applications/features with a care recipient profile/account, enabling the care giver to control both accounts without signing out.

20 Claims, 25 Drawing Sheets

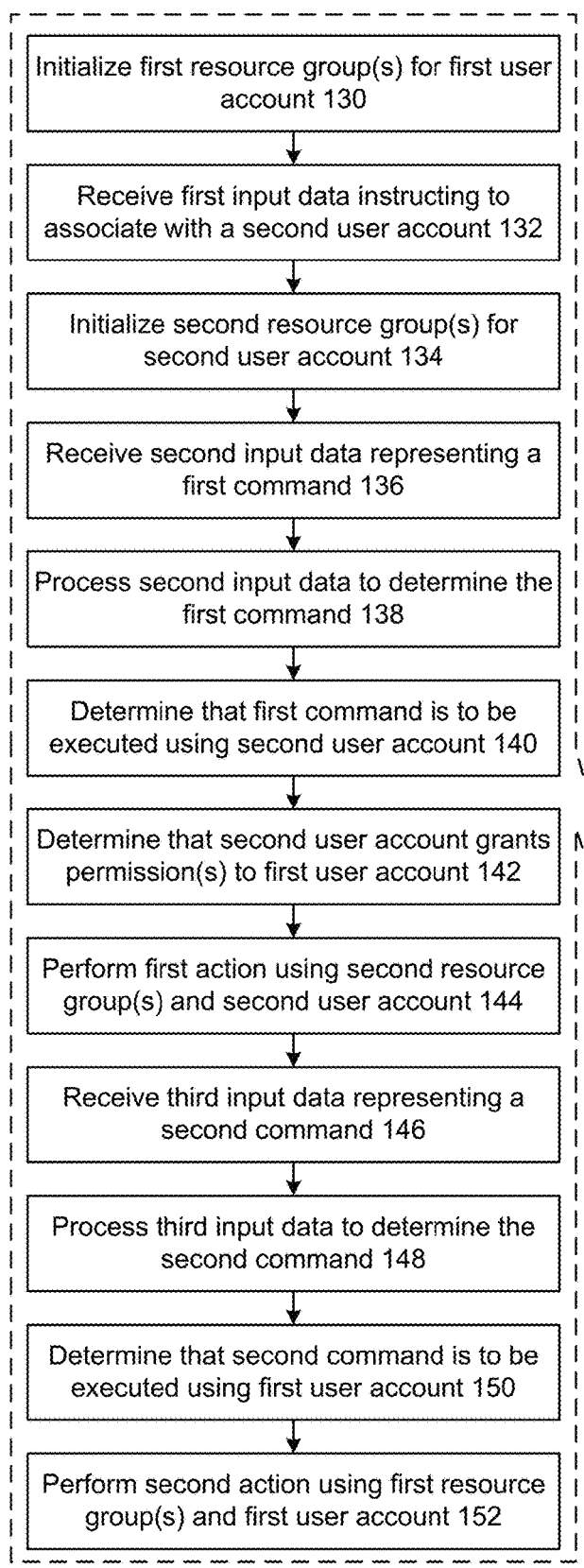
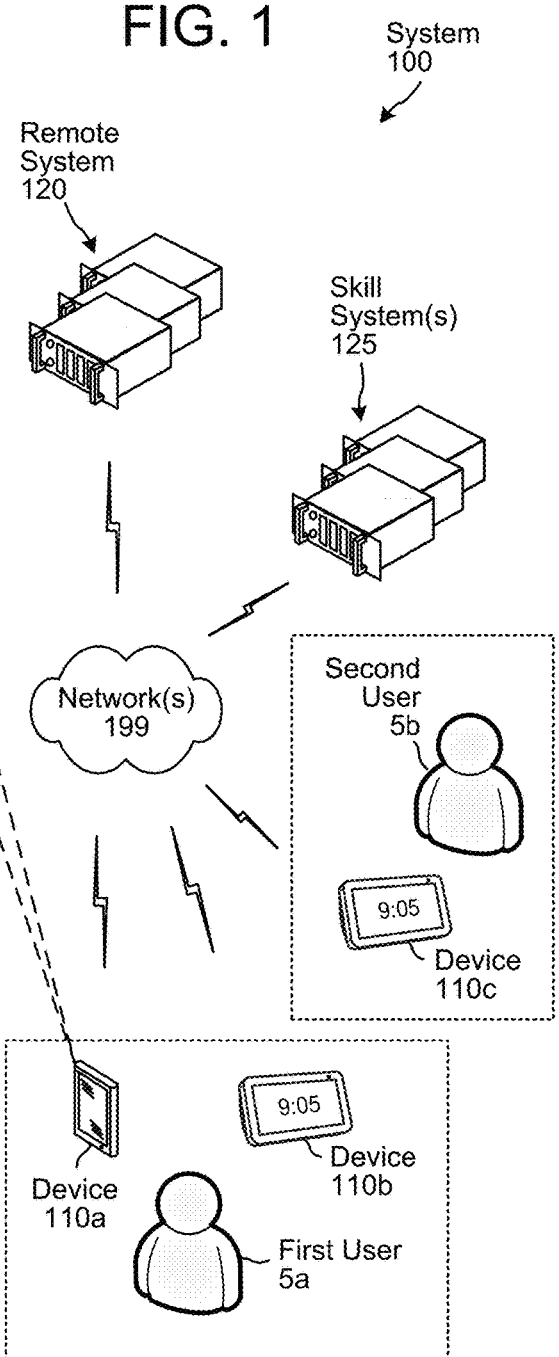
FIG. 1

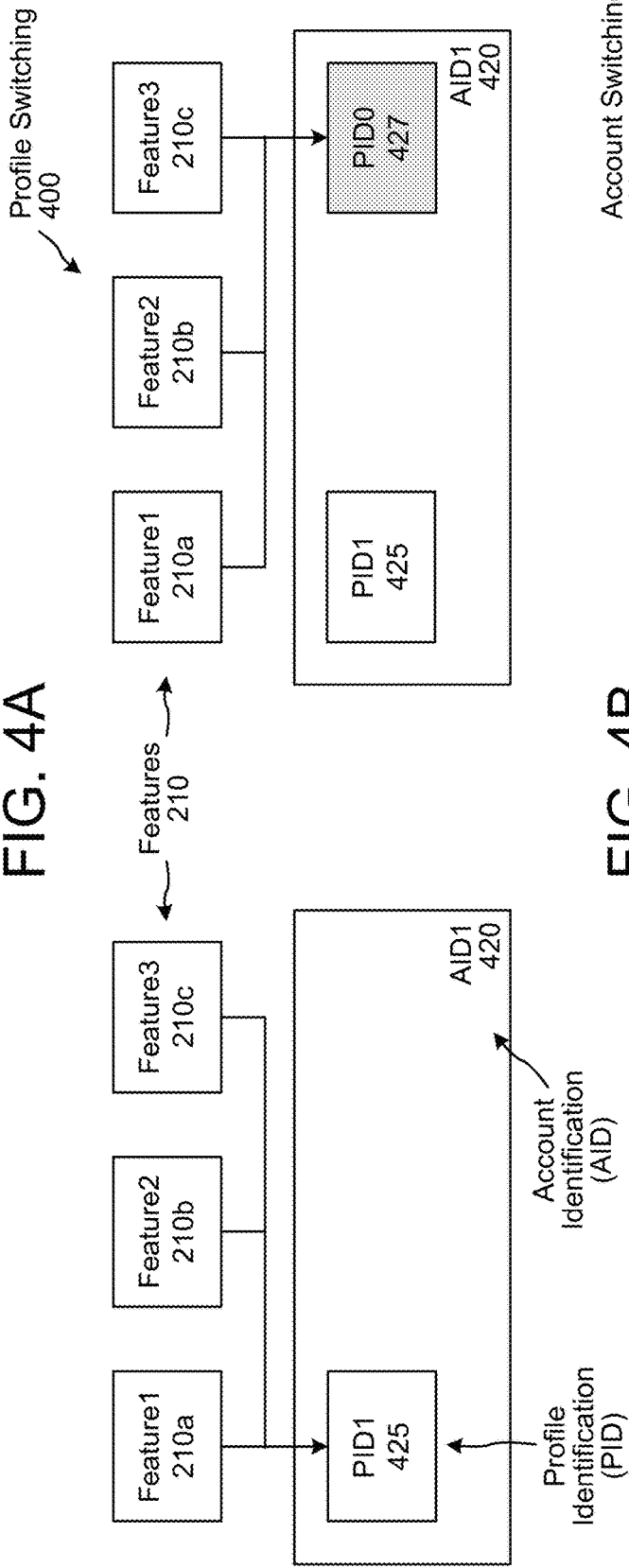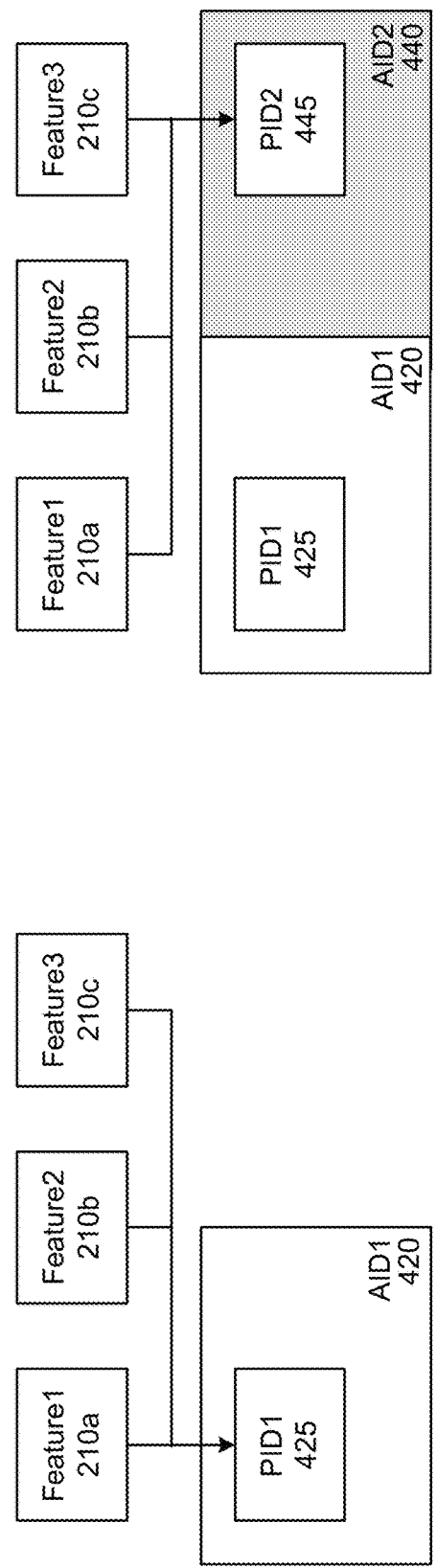
FIG. 4A
FIG. 4B

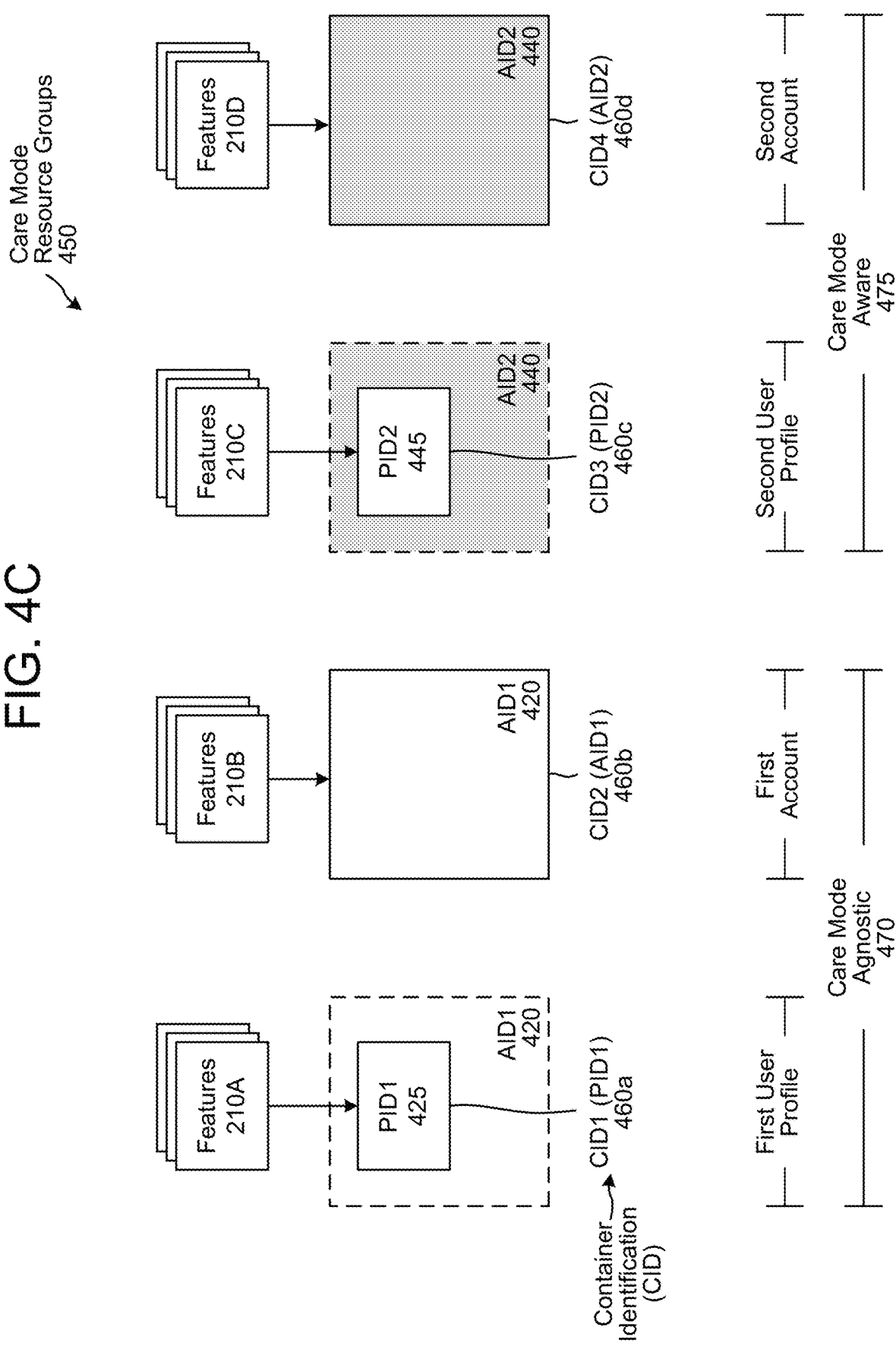

FIG. 5
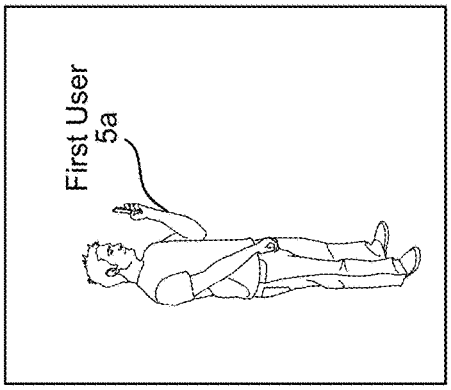
Care Mode Off/Agnostic 510
First User 5a
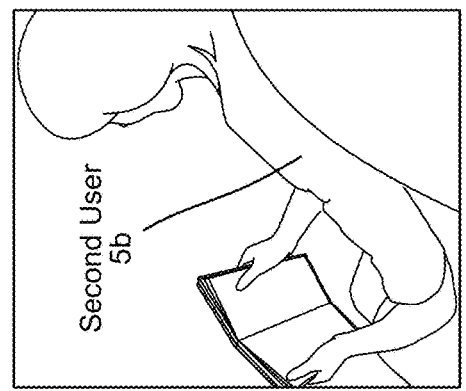
Care Mode On/Aware 520
Second User 5b
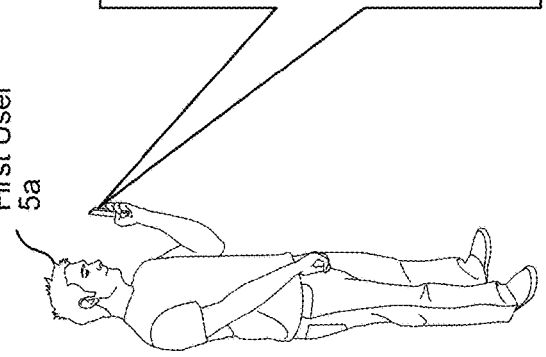
First User 5a
Features 210A → PID1 425 | AID1 420
Features 210B → AID1 420
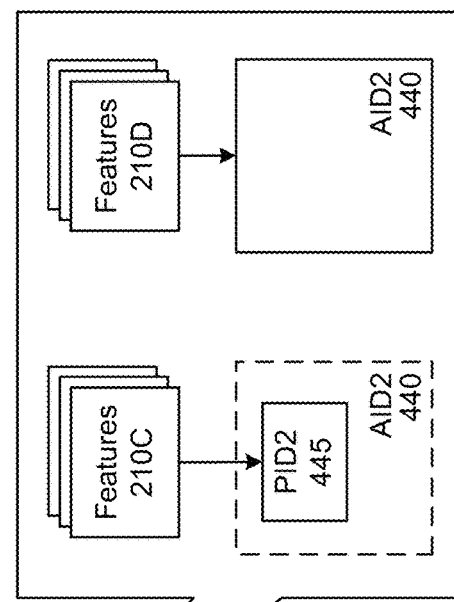
First User 5a
Features 210C → PID2 445 | AID2 440
Features 210D → AID2 440

FIG. 6

Care Mode Resource Group Example 600

|  | Care Mode OFF | Care Mode ON |
|---|---|---|
| Account Level Features — Care Mode Agnostic Features | AID1 420 | AID1 420 |
| Account Level Features — Care Mode Aware Features | AID1 420 | AID2 440 |
| Profile Level Features — Care Mode Agnostic Features | PID1 425 | PID1 425 |
| Profile Level Features — Care Mode Aware Features | PID1 425 | PID2 445 |

← Associated Resource Groups 610

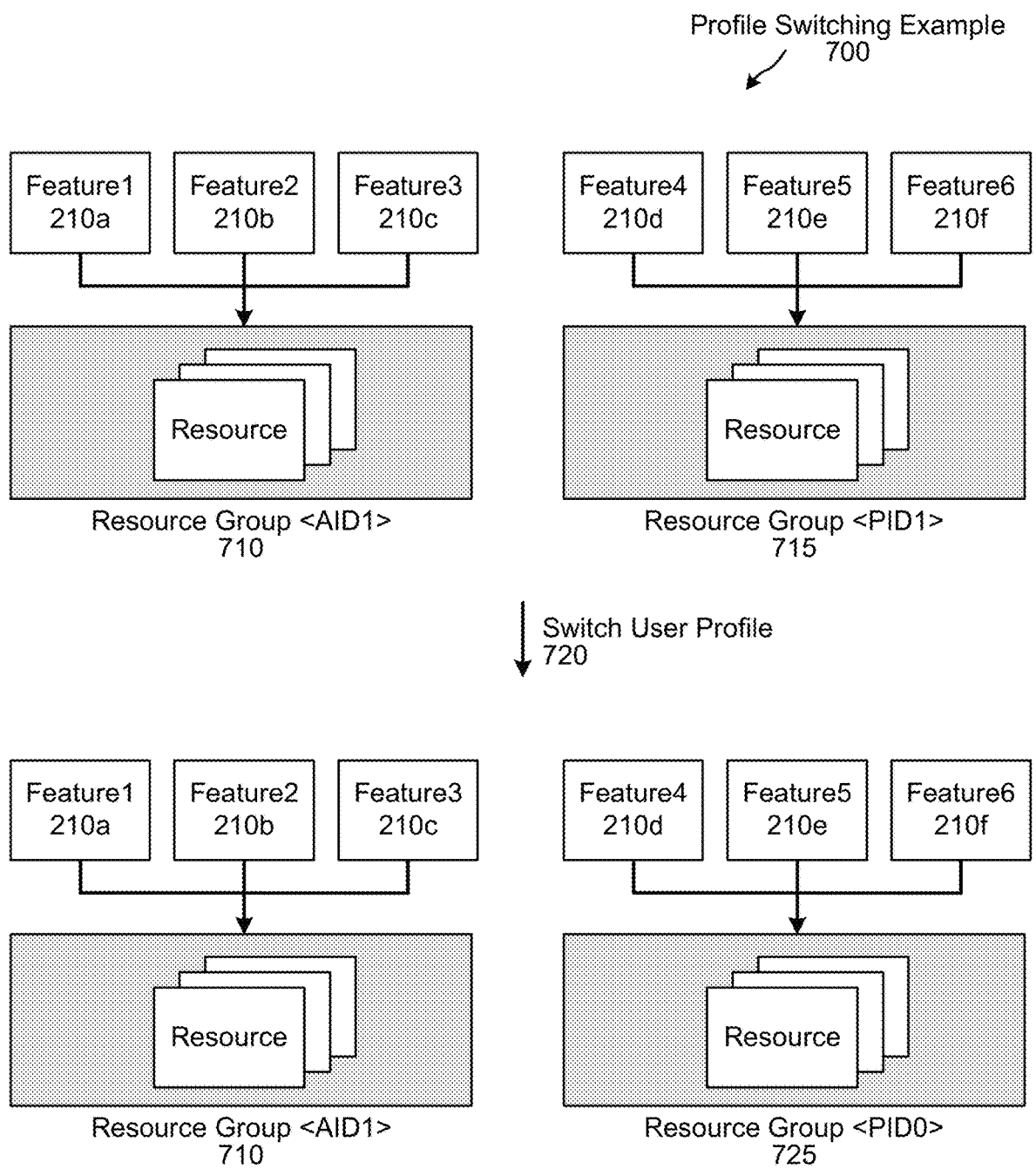

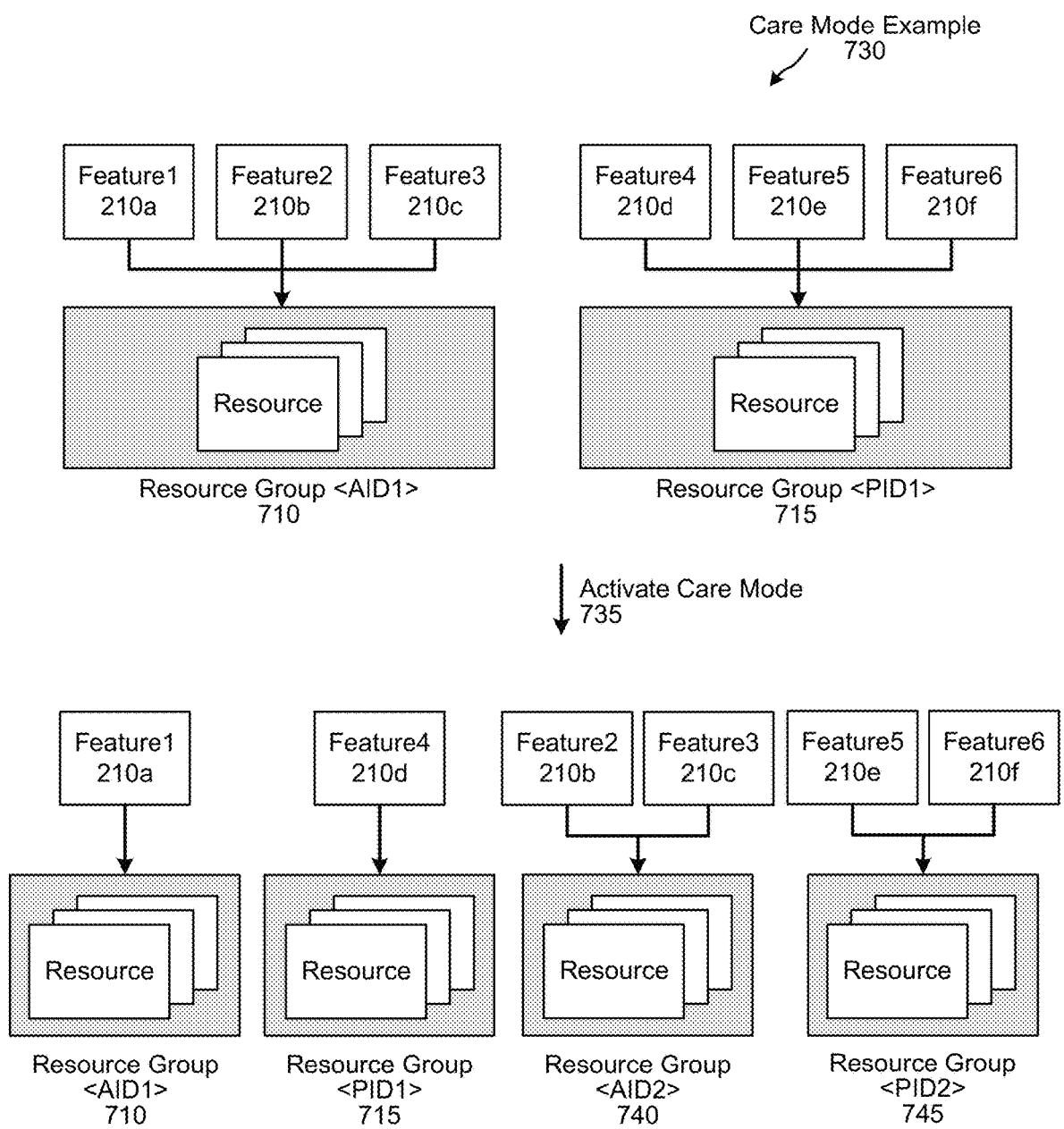

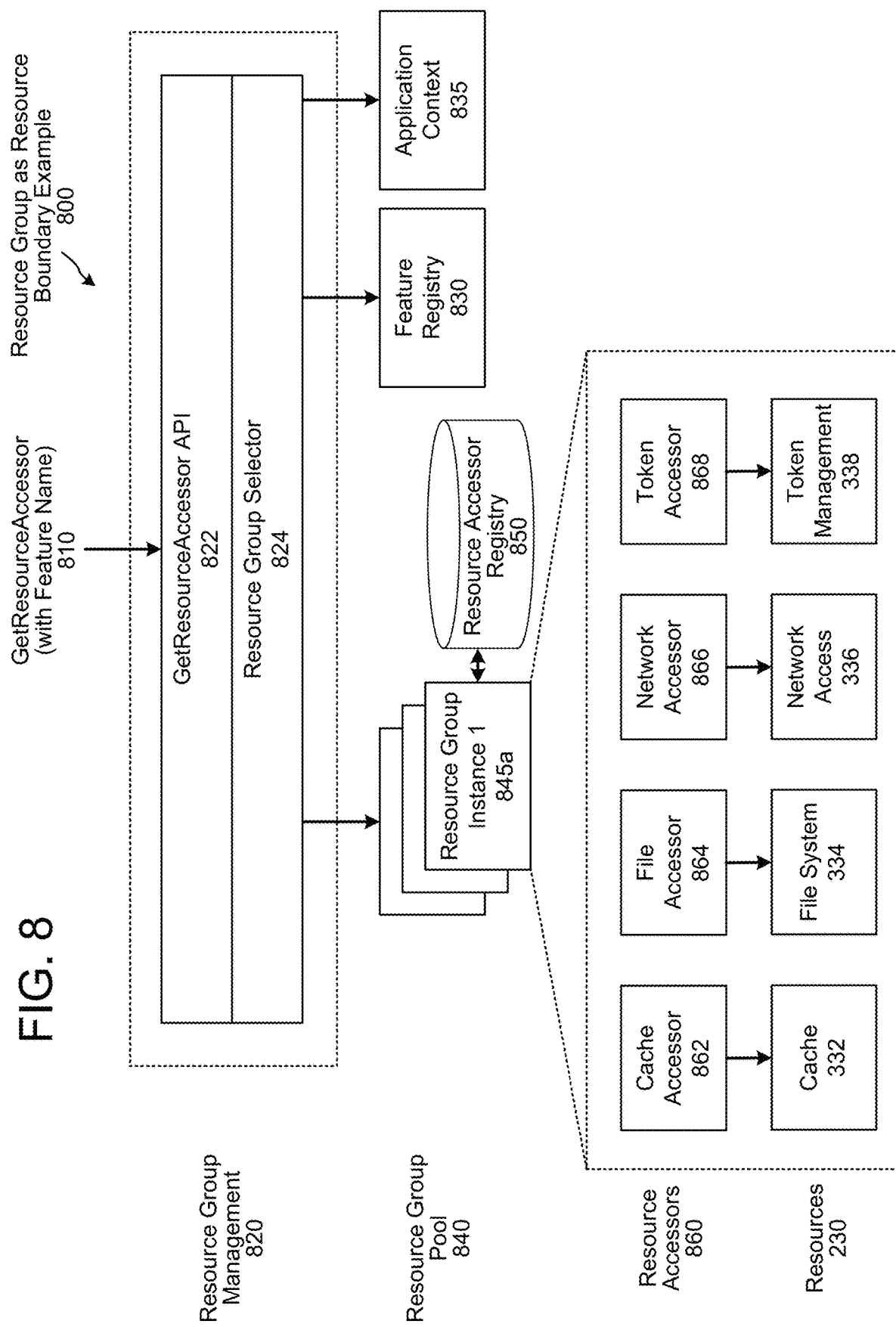

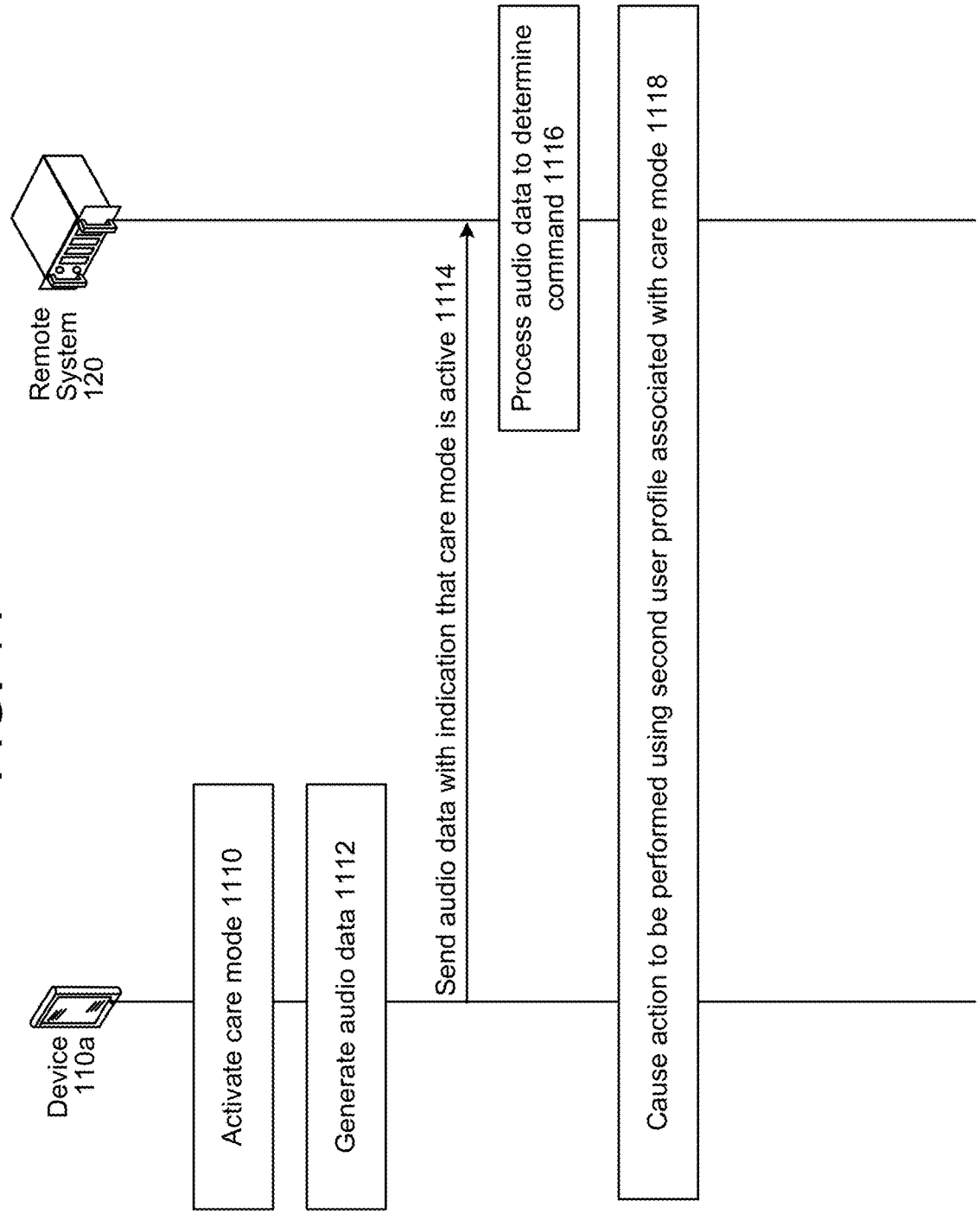

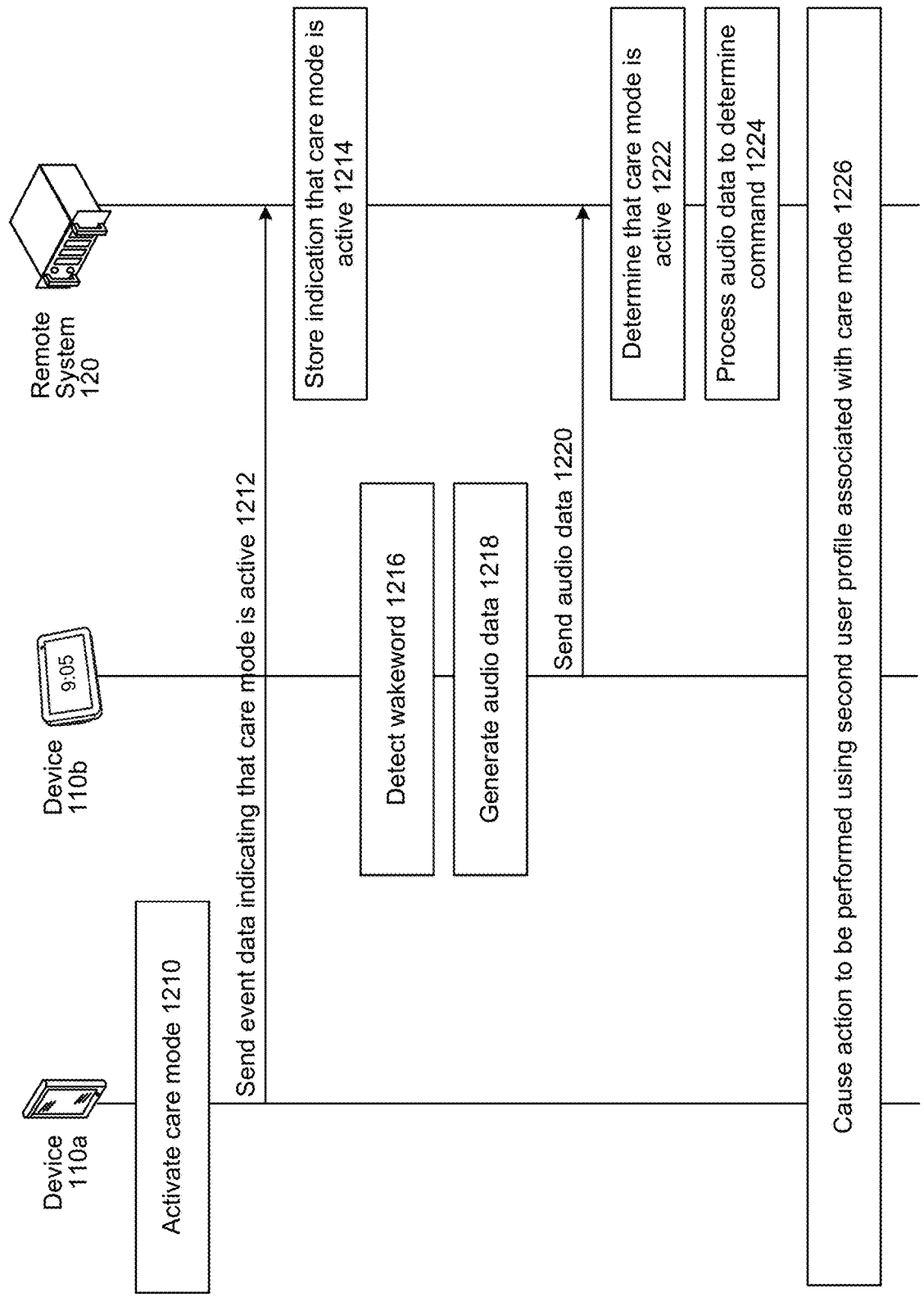

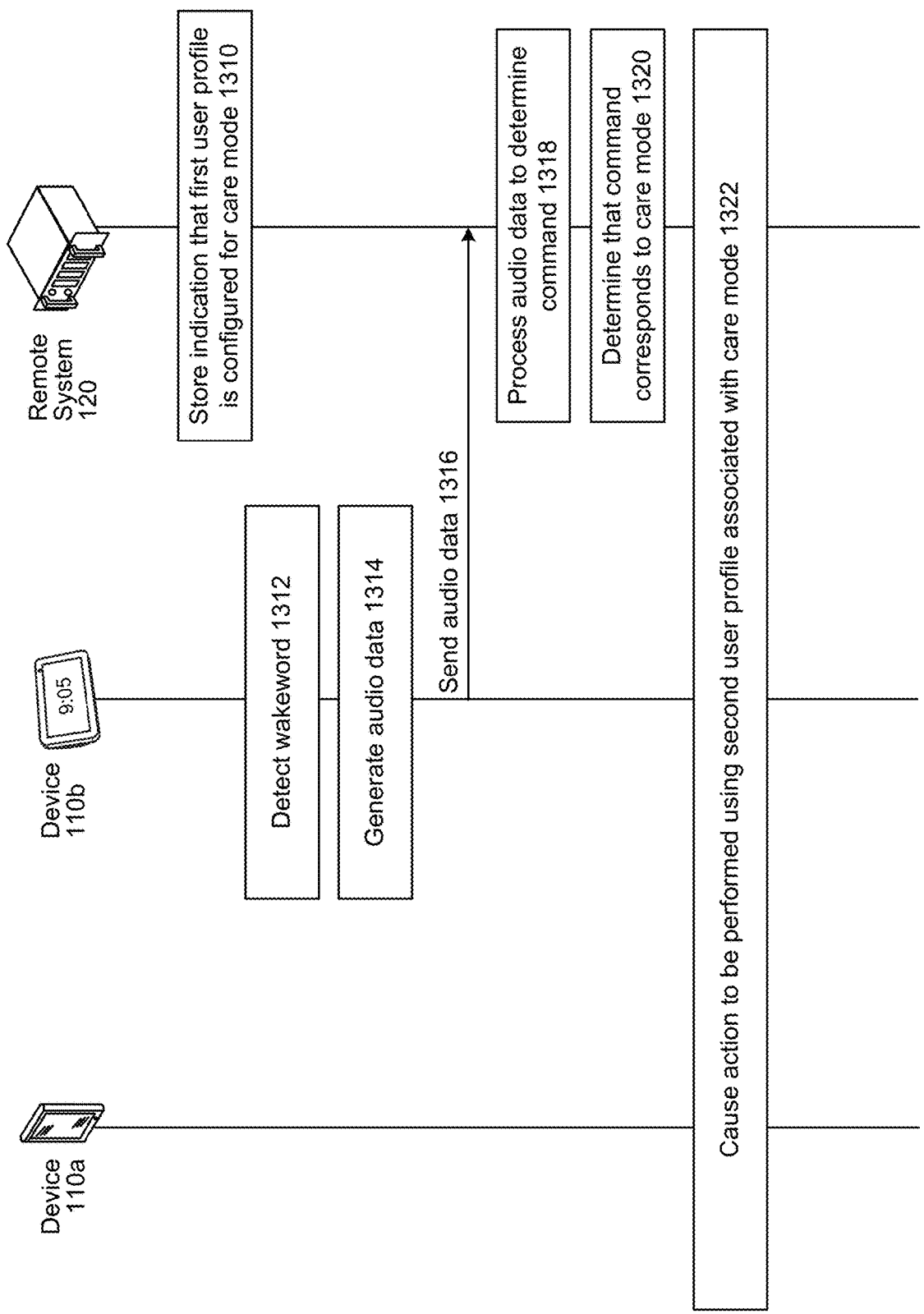

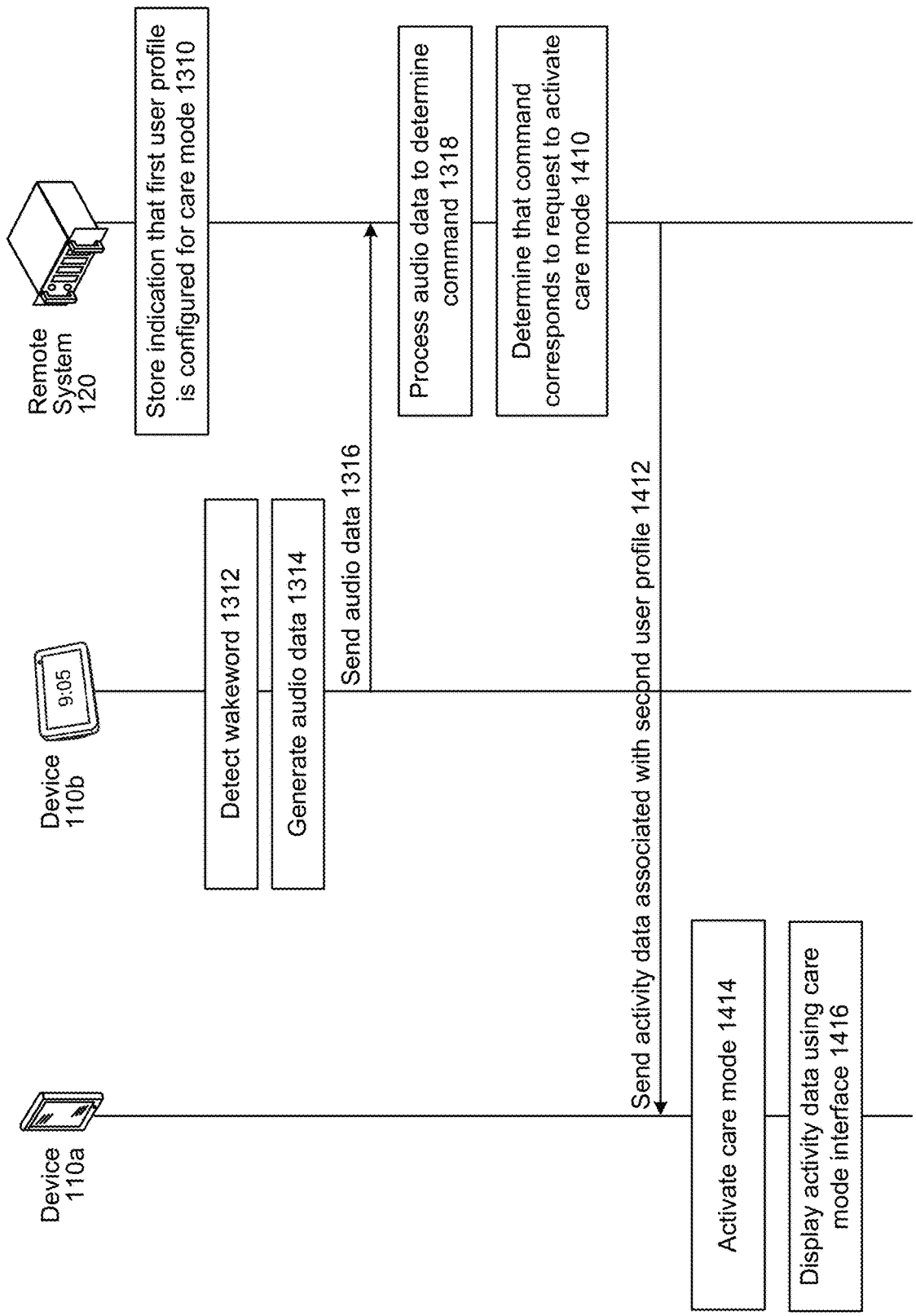

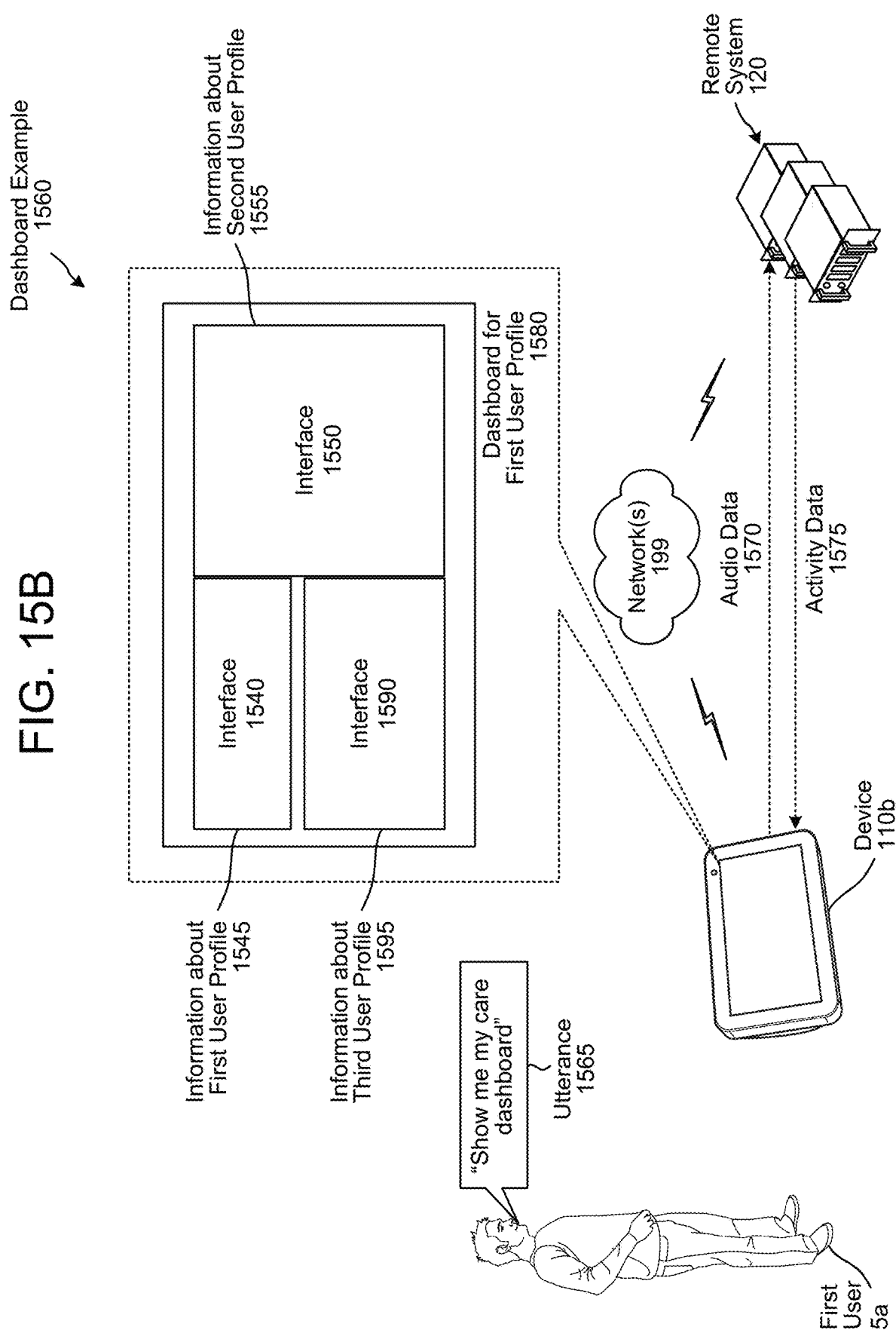

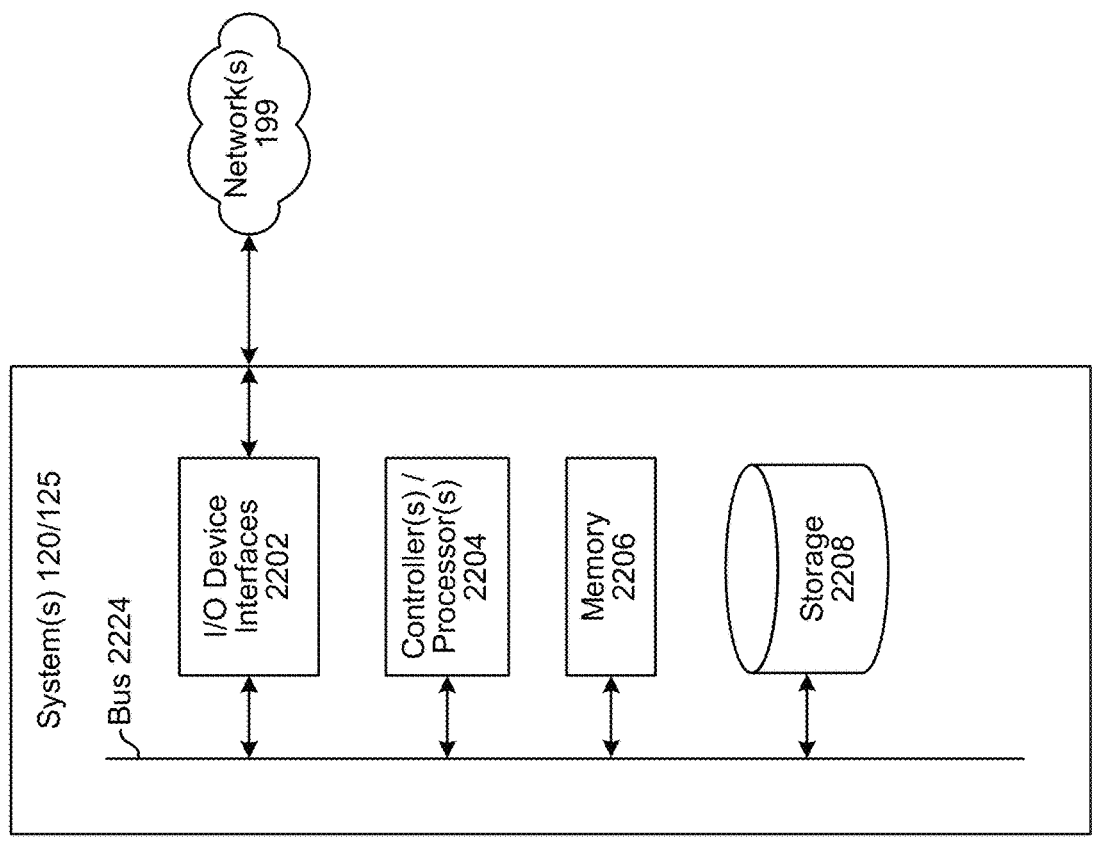

RESOURCE GROUPED ARCHITECTURE FOR PROFILE SWITCHING

BACKGROUND

With the advancement of technology, the use and popularity of electronic devices has increased considerably. Electronic devices are commonly used to capture and send audio data and/or perform actions corresponding to input commands.

BRIEF DESCRIPTION OF DRAWINGS

For a more complete understanding of the present disclosure, reference is now made to the following description taken in conjunction with the accompanying drawings.

FIG. 1 is a conceptual diagram illustrating a system configured to enable profile switching using resource grouped architecture.

FIGS. 4A-4C illustrate examples of profile switching, account switching, and care mode resource groups.

FIG. 5 illustrates an example of a care giver performing profile switching.

FIG. 6 illustrates examples of resource groups enabling a care giver to perform profile switching.

FIGS. 7A-7B illustrate examples of resource groups associated with profile switching.

FIG. 8 illustrates an example of resource grouped architecture using a resource group as a resource boundary.

FIG. 11 illustrates a communication diagram to enable account switching for voice commands using context data.

FIG. 12 illustrates a communication diagram to enable account switching for voice commands using event data.

FIG. 13 illustrates a communication diagram for processing a voice command and identifying an output profile with which to perform an action.

FIG. 14 illustrates a communication diagram for generating a graphical interface representing a dashboard in response to a voice command.

FIGS. 15A-15B illustrate examples of a graphical interface representing a dashboard.

FIG. 22 is a block diagram conceptually illustrating example components of a system.

DETAILED DESCRIPTION

Figure 2:
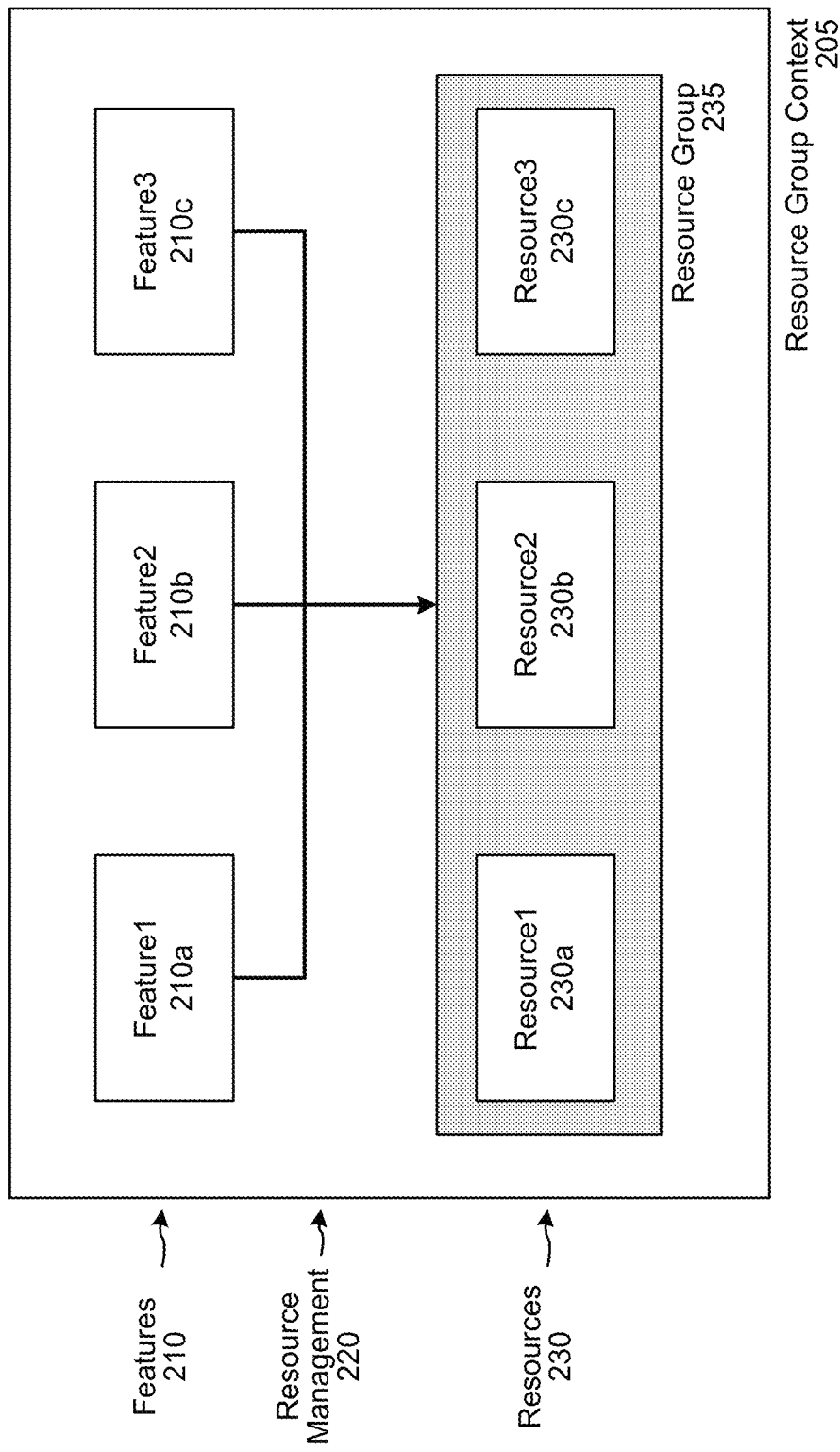
FIG. 2 illustrates an example of resource management using a resource group.

Electronic devices are commonly used to interact with a user by capturing audio data and/or other input data to determine input commands. These input commands can correspond to direct commands (e.g., input using a graphical user interface) or natural language inputs (e.g., spoken inputs and/or typed inputs) associated with a user profile. A device or system may cause an action associated with the user profile to be performed in response to these input commands.

To improve a user experience, the present disclosure improves such systems by providing a mechanism for profile switching (e.g., switching between user profiles within the same user account) and/or performing additional functionality such as account switching (e.g., switching between different user accounts) using resource grouped architecture (e.g., container based architecture). For example, the system may group multiple applications and/or features (e.g., components of an application that provide certain functionality) together and associate them with a resource group. A resource group is a container that includes a set of resources that are shared between a plurality of features and are essential for the plurality of features to execute logic. For example, the resources within a resource group may correspond to a variety of different components, data, state, and/or other information for the plurality of features associated with the resource group. Thus, each of the plurality of features in a resource group may use the same set of resources, which enables the system to update the resources for multiple features at a time.

Updating the resources for multiple features at a time reduces a complexity of resource management. In addition, the system may maintain multiple resource groups simultaneously, enabling the system to update resource group(s) corresponding to individual user profile(s) and/or user account(s). Instead of refreshing and/or resetting the resources when switching user profiles and/or user accounts, the system identifies profile level features that are affected by profile switching and/or account level features affected by account switching and associate the affected features with a new resource group.

To illustrate an example, the system may perform profile/account switching by moving feature(s) from a first resource group to a second resource group. For example, the system may maintain a first resource group for a first user profile and a second resource group for a second user profile. To perform profile switching between the first user profile and the second user profile, the system can associate profile level features (e.g., features that perform a task differently depending on an active user profile) with the second resource group instead of the first resource group. Similarly, the system may maintain a third resource group for a first user account and a fourth resource group for a second user account. To perform account switching between the first user account and the second user account, the system can associate account level features (e.g., features that will perform a task identically for all user profiles associated with an active user account, but differently depending on an active user account) with the fourth resource group instead of the third resource group.

Using these resource groups, the system enables a single user to control and/or monitor multiple user profiles and/or user accounts without signing out of an application. For example, the system may enable a first user to input commands on behalf of the first user or a second user. As each user profile/account corresponds to an individual resource group, the system can associate some features with a first user account and other features with a second user account. Thus, the first user may continue to receive notifications, communications, and/or the like associated with the first account while performing actions on behalf of the second user using the second user account.

FIG. 1 illustrates an example of a system 100 configured to enable profile switching using resource grouped architecture. Although the figures and discussion of the present disclosure illustrate certain steps in a particular order, the steps described may be performed in a different order (as well as certain steps removed or added) without departing from the present disclosure. As shown in FIG. 1, the system 100 may include one or more devices (110a/110b) local to a first user 5a, along with a device 110c local to a second user 5b. In some examples, the system 100 may also include a natural language processing (NLP) remote system 120 and one or more skill system(s) 125. As illustrated in FIG. 1, the one or more devices (110a/110b/110c), the remote system 120, and the skill system(s) 125 may communicate across one or more networks 199.

In some examples, the first user 5a may be in proximity to the second user 5b. For example, the first user 5a may share an environment with the second user 5b. However, the disclosure is not limited thereto, and in other examples the first user 5a may be at a location that is different from the second user 5b without departing from the disclosure.

FIG. 1 includes a process flow illustrating how the device 110a may perform profile switching to enable the first user 5a to input commands using a first user profile associated with the first user 5a and/or a second user profile associated with the second user 5b. As described in greater detail below with regard to FIG. 17, in some examples the remote system 120 may be configured to perform natural language processing (NLP) to determine actions responsive to input commands received from the first user 5a without departing from the disclosure. For example, the remote system 120 may process audio data received from the first device 110a and/or the second device 110b to determine an action to perform that is responsive to a voice command represented in the audio data. However, the disclosure is not limited thereto and the remote system 120 may receive input commands using any techniques known to one of skill in the art without departing from the disclosure.

To improve profile switching (e.g., switching between user profiles within the same user account) and/or provide additional functionality such as account switching (e.g., switching between different user accounts), the system 100 may be configured using resource grouped architecture (e.g., container based architecture). For example, the system 100 may generate multiple resource groups, with an individual resource group associated with a single instance of the resources. As used herein, a resource group may refer to a container (e.g., user space instance), which may be a sandbox composed of resources that are essential for applications and/or features associated with the resource group to execute logic. For example, the resources within a resource group may provide data, state, and/or other information for the applications/features associated with the resource group. Thus, multiple applications/features may be associated with a single resource group (e.g., multiple applications/features may run in one resource group) and share the same set of resources. For example, a first resource group may be associated with a first plurality of applications/features and may include a token resource with which the applications/features may construct a network request. Thus, all of the first plurality of applications/features associated with the first resource group may use the same token in a network request header.

Using this resource grouped architecture, the system 100 may simplify the process of refreshing and/or resetting the resources when switching a user profile and/or user account. Instead of requiring that each of the applications/features individually manage the resources and/or requiring that all of the resources be reset/refreshed each time the device 110 switches a user profile and/or user account, the resource grouped architecture enables the system 100 to manage the resources for multiple applications/features associated with a single resource group. For example, the system 100 may identify a first plurality of applications/features that are associated with a first user profile and associate the first plurality of applications/features with a first resource group, which includes a first set of resources corresponding to the first user profile. If the first user 5a switches to a second user profile, the system 100 may associate the first plurality of applications/features with a second resource group, which includes a second set of resources corresponding to the second user profile. Thus, the resource grouped architecture enables the system 100 to separately track multiple instances of the resources, such that the system 100 does not reset/refresh the resources each time profile switching and/or account switching occurs. Instead, the system 100 may update each individual resource group and change an association between the applications/features and the resource grouped on the current user profile and/or user account selected by the first user 5a.

While the system 100 may generate multiple resource groups, and multiple applications/features may be associated with a single resource group, each application/feature is only associated with a single resource group at a time. For example, a first application/feature may be associated with a first resource group corresponding to a first user profile. If the first user 5a switches from the first user profile to a second user profile, the system 100 may change the association for the first application/feature such that it is now associated with a second resource group corresponding to the second user profile. Thus, while the first application/feature is only associated with a single resource group at a time, the first application/feature may switch between multiple resource groups over a period of time without departing from the disclosure.

By associating the resources with resource groups, the device 110 may simplify the process of resetting and/or refreshing the resources and/or may reduce the frequency with which the resources need to be reset and/or refreshed without departing from the disclosure. In some examples, the system 100 may reset, refresh, and/or update resources for multiple applications/features by resetting, refreshing, and/or updating a single resource group. Thus, the resource grouped architecture reduces a complexity associated with updating the resources during profile switching, account switching, and/or the like. Additionally or alternatively, the system 100 may reduce a frequency with which the resources are refreshed and/or reset using the resource grouped architecture. For example, the system 100 may update first resources (e.g., a first instance of the resources) associated with a first user profile in a first resource group and may update second resources (e.g., a second instance of the resources) associated with a second user profile in a second resource group. When the device 110 performs profile switching to switch from the first user profile to the second user profile, the device 110 does not reset the resources but instead switches impacted applications/features from the first resource group to the second resource group.

As described in greater detail below with regard to FIG. 4C-6, account switching may enable additional functionality to improve a user experience, which may be referred to as activating a care mode. For example, activating the care mode enables the first user 5a (e.g., a care giver) associated with a first user account to log in using a second user account associated with the second user 5b (e.g., care recipient). This enables the first user 5a to input commands or perform actions on behalf of the second user 5b without requiring that the first user 5a sign out of the first user account.

To illustrate an example, the first user 5a may be associated with a first user profile and a first user account, while the second user 5b may be associated with a second user profile and a second user account. When care mode is not active, the first device 110a may perform all actions using the first user profile and the first user account associated with the first user 5a. For example, the first device 110a may process input commands using a first resource group associated with the first user profile or a second resource group associated with the first user account (e.g., common to multiple user profiles of the first user account).

When care more is active, the first device 110a may perform some actions using the first user profile and/or the first user account, but may also perform other actions using the second user profile and/or the second user account associated with the second user 5b. For example, the first device 110a may process some input commands using the first resource group or the second resource group associated with the first user 5a, but may process other input commands using a third resource group associated with the second user profile or a fourth resource group associated with the second user account (e.g., common to multiple user profiles of the second user account). Thus, care mode enables the first user 5a to easily switch between the first user profile/first user account and the second user profile/second user account to enable the first user 5a to control the second user profile/second user account for the second user 5b.

As illustrated in FIG. 1, the first device 110a may initialize (130) first resource group(s) for a first user account. For example, the first device 110a may associate the first user account and/or a first user profile corresponding to the first user account with the first resource group(s). The first device 110a may receive (132) first input data instructing the first device 110a to associate with a second user account. For example, the first device 110a may receive an input command activating care mode to enable the first user 5a to control the second user account associated with the second user 5b. In response to the first input data, the first device 110a may initialize (134) second resource group(s) for the second user account. For example, the first device 110a may associate the second user account and/or a second user profile corresponding to the second user account with the second resource group(s).

In some examples, the first device 110a may initialize a first resource group for the first user profile, a second resource group for the first user account, a third resource group for the second user profile, and a fourth resource group for the second user account. However, the disclosure is not limited thereto and in other examples the first device 110a may initialize a first resource group for the first user profile/account and a second resource group for the second user profile/account without departing from the disclosure.

The first device 110a may receive (136) second input data representing a first command, may process (138) the second input data to determine the first command, and may determine (140) that the first command is to be executed using the second user account. For example, the first device 110a may receive a first input command from the first user 5a on a graphical user interface of the first device 110a and may process the first input command to determine a first action to perform. However, the disclosure is not limited thereto, and in some examples the first device 110a may receive a natural language input or other input command without departing from the disclosure. As described in greater detail below, the first device 110a may perform natural language processing on the natural language input and/or may send the natural language input to the remote system 120 for natural language processing without departing from the disclosure.

The first device 110a may determine that the first command is to be executed using the second user account using multiple techniques without departing from the disclosure. In some examples, the first input command may explicitly indicate the second user account. For example, the first device 110a may receive the first input command using the GUI and the first user 5a may select the second user account while generating the first input command. Additionally or alternatively, the natural language input may mention the second user account as part of a voice command. However, the disclosure is not limited thereto, and in other examples the first device 110a may infer that the first command is to be executed using the second user account based on the type of command, the action to perform, a named entity represented in the command, a user history or previous commands, and/or the like. For example, a natural language input may request that a specific entity (e.g., light bulb or other device) be turned on and the first device 110a may determine that the second user account includes the specific entity but that the first user account does not.

The first device 110a may determine (142) that the second user account grants permission(s) to the first user account. For example, the first device 110a may verify that the first user account is granted permission(s) to control the second user account, such as the second user 5b is authorized in a care giver/care receiver relationship.

After verifying that the first user account has the appropriate permission(s), the first device 110a may perform (144) a first action using the second resource group(s) and the second user account. For example, the first device 110a may cause the first command to be executed by first device 110a, the third device 110c, the remote system 120, and/or any device associated with the second user account as though the second user 5b issued the first command. Causing the first command to be executed may correspond to one of the devices 110, the remote system 120, and/or other components associated with the second user account performing the first action responsive to the first command. For example, the first device 110a may turn on/off lights, check the weather, modify device settings, account settings, and/or the like for the second user account, although the disclosure is not limited thereto.

The first device 110a may receive (146) third input data representing a second command, may process (148) the third input data to determine the second command, and may determine (150) that the second command is to be executed using the first user account. For example, the first device 110a may receive a second input command from the first user 5a on the graphical user interface of the first device 110a and may process the second input command to determine a second action to perform. However, the disclosure is not limited thereto, and in some examples the first device 110a may receive a natural language input or other input command without departing from the disclosure.

As described above, the first device 110a may determine that the second command is to be executed using the first user account using multiple techniques without departing from the disclosure. In some examples, the second input command may explicitly indicate the second user account.

For example, the first device 110a may receive the second input command using the GUI and the first user 5a may select the first user account while generating the second input command. Additionally or alternatively, the natural language input may mention the first user account as part of a second voice command. However, the disclosure is not limited thereto, and in other examples the first device 110a may infer that the second command is to be executed using the first user account based on the type of command, the action to perform, a named entity represented in the second command, a user history or previous commands, and/or the like. For example, a natural language input may request that a specific entity (e.g., light bulb or other device) be turned on and the first device 110a may determine that the first user account includes the specific entity but that the second user account does not.

The first device 110a may perform (152) a second action using the first resource group(s) and the first user account. For example, the first device 110a may cause the second command to be executed by first device 110a, the third device 110c, the remote system 120, and/or any device associated with the first user account as though the first user 5a issued the first command. Causing the second command to be executed may correspond to one of the devices 110, the remote system 120, and/or other components associated with the first user account performing the second action responsive to the second command. For example, the first device 110a may turn on/off lights, check the weather, modify device settings, account settings, and/or the like for the first user account, although the disclosure is not limited thereto.

While FIG. 1 illustrates an example in which the first user 5a is granted permission(s) to perform actions on behalf of a second user 5b (e.g., using the second user profile and/or the second account), the disclosure is not limited thereto. In some examples, the first user 5a may be granted permission(s) associated with a plurality of users without departing from the disclosure, enabling the first user 5a to perform actions on behalf of two or more user profiles and/or user accounts without departing from the disclosure.

While the above description illustrates an example of the first device 110a receiving a direct input command from the first user 5a using a user interface, such as a graphical user interface (GUI), the disclosure is not limited thereto. Instead, in some examples the remote system 120 may enable a voice interface to process input commands that correspond to natural language inputs. For example, a device 110 may receive audio corresponding to a spoken natural language input originating from the first user 5a. The device 110 may generate audio data corresponding to the audio and may send the audio data to the remote system 120. Alternatively, the device 110 may receive a typed natural language input from the first user 5a. The device 110 may generate text data corresponding to the typed input and may send the text data to the remote system 120.

In some examples, the device 110 may send the audio data and/or the text data to the remote system 120 via a first application that is installed on the device 110 and associated with the remote system 120. An example of such an application is the Amazon Alexa application that may be installed on a smart phone, tablet, or the like.

In some examples, the remote system 120 may determine that the natural language input (e.g., audio data/text data) corresponds to a command to begin a first skill. For example, the natural language input may represent a command to perform a first action using a first skill system 125 associated with the first skill. For ease of illustration, the first skill and the first skill system 125 may be used interchangeably without departing from the disclosure. For example, the first skill may correspond to a skill associated with the first skill system 125, which is a data receiving skill system separate from the remote system 120. To perform the first action, the remote system 120 may send a command to perform the first action to the first skill system 125. In some examples, the remote system 120 may determine that the first action corresponds to event data associated with a smart home skill system(s) 125. Thus, the remote system 120 may also send a command to the smart home skill system(s) 125 to share event data with the first skill system 125.

In some examples, the devices 110 and/or the remote system 120 may perform an action by interacting with the one or more skill system(s) 125. For example, each of the one or more skill system(s) 125 may be associated with specific functionality, such that the system 100 may identify a first skill system corresponding to the action and may send an instruction to the first skill system to perform the action. The one or more skill system(s) 125 may perform any functionality known to one of skill in the art without departing from the disclosure.

In some examples, a smart home skill system(s) 125 may be configured to interact with one or more devices 110 associated with the second user profile. For example, the smart home skill system(s) 125 may enable the first user 5a to turn on and off smart light switches, smart plugs, and/or the like, to receive temperature information and/or control a thermostat, to monitor security cameras and/or receive event data corresponding to a security system (e.g., data from components of a security system such as cameras, door/window sensors, etc. that are connected to a security system configured to operate with components discussed herein), to receive sensor data and/or event data from a plurality of sensors, and/or the like. Thus, the first user 5 may monitor the second user 5b and/or control a smart home environment using the smart home skill system(s) 125 using techniques known to one of skill in the art. In some examples, the smart home skill system(s) 125 may monitor device state information for each of the plurality of devices 110 associated with the second user profile.

Some of the other skill system(s) 125 may be configured to perform additional functionality. For example, some of the skill system(s) 125 may be configured to play games or provide other entertainment for the user(s) 5. While not illustrated in FIG. 1, other skill system(s) 125 may perform similar functionality to the smart home skill system(s) 125 without departing from the disclosure. For example, a security skill system may monitor event data using techniques described below with regard to the smart home skill system(s) 125 without departing from the disclosure.

Examples of event data include a motion event (e.g., any movement detected), a user motion event (e.g., an identified user is detected), a button press event (e.g., button receives input), audio detected event (e.g., audio exceeds a threshold), speech detected event (e.g., audio exceeds a threshold and corresponds to speech), a user speech event (e.g., speech is detected that corresponds to an identified user), a location event (e.g., a location of an audio source is determined using audio beamforming, a location of an object is determined using object recognition, and/or the like), an object detected event (e.g., object is detected in image data), a face detected event (e.g., a human face is detected in image data), a user detected event (e.g., an identified user is detected in image data), and/or the like.

In some examples, the system 100 may send event data or other information to the remote system 120 in response to a user utterance. For example, the system 100 may enable a voice interface such that the first user 5a may request information about event data and receive a system response indicating the requested information, although the disclosure is not limited thereto. To illustrate an example, the first user 5a may input an utterance (e.g., "Tell me what events have happened in the last ten minutes") and the system 100 may generate a system response (e.g., "A hallway sensor detected motion 20 times in the last ten minutes"). Additionally or alternatively, the first user 5a may input an utterance (e.g., "Alexa, how is Mom doing?") and the system 100 may generate a system response (e.g., display a dashboard or other highlights indicating overall activity or other information relevant to a care giver).

Additionally or alternatively, a skill system(s) 125 may be configured to monitor motion or other event data associated with the second user 5b and send a notification to the first user 5a if no motion is detected within a duration of time. For example, the first user 5a may monitor an elderly family member (e.g., second user 5b) remotely using the system 100. Thus, if the system 100 does not detect motion within the duration of time (e.g., hour, several hours, etc.), the system 100 may send a notification alerting the first user 5a that no motion has been detected.

Typically, conventional systems are configured such that features manage resources directly. For example, a contacts feature may maintain a first cache resource, a calendar feature may maintain a second cache resource, a store feature may maintain a third cache resource, a settings feature may maintain a fourth cache resource, and so on. Thus, resources store states that are essential to the features and the features manage these states directly (e.g., without involving other components).

To illustrate an example, the contacts feature may be associated with a first cache resource, a first file system resource, a first network access resource, a first token management resource, and/or the like. Similarly, the calendar feature may be associated with a second cache resource, a second file system resource, a second network access resource, a second token management resource, and/or the like. The store feature may be associated with a third cache resource, a third file system resource, a third network access resource, a third token management resource, and/or the like. Finally, the settings feature may be associated with a fourth cache resource, a fourth file system resource, a fourth network access resource, a fourth token management resource, and/or the like.

In a conventional system, these resources make an assumption that a context (e.g., user profile, user account, and/or the like) will not change. For example, the contacts feature has only a single cache instance for the first cache resource, which is associated with a first user profile. If the device 110 switches user profiles to a second user profile, however, the values or other information stored in the first cache resource is invalidated and must be reset and/or refreshed to function properly with the second user profile. Thus, each of the resources associated with the first user profile must be reset and/or refreshed to update stale or invalid data. This requires that each of the features must detect that profile switching occurred, determine whether the resources must be reset to function properly with the second user profile, and then reset the resources accordingly. The same process may occur when switching to a second user account.

In some examples, all of the features may be associated with a user profile. For example, each of the features may be associated with the first user profile, such that switching to the second user profile requires that each of the resources corresponding to the features be reset and/or refreshed. In other examples, all of the features may be associated with a user account instead of a user profile. For example, each of the features may be associated with a first user account, such that switching to a second user profile does not change the resources but switching to a second user account requires that each of the resources corresponding to the features be reset and/or refreshed.

The disclosure is not limited thereto, however, and in some examples some of the features (e.g., a first plurality of features) may be associated with a user account (e.g., common to multiple user profiles associated with a single user account) and some of the features (e.g., a second plurality of features) may be associated with a user profile (e.g., specific to individual user profiles of the user account). For example, each of the first plurality of features may be associated with the first user account while each of the second plurality of features may be associated with the first user profile. Thus, switching to the second user profile within the first user account only requires that the second plurality of features be reset and/or refreshed, as the first plurality of features is common to all of the user profiles associated with the first user account. However, switching to a second user account will require that the first plurality of features and the second plurality of features be reset and/or refreshed, as none of the first plurality of features are associated with the second user account and none of the second plurality of features are associated with the second user profile.

FIG. 2 illustrates an example of resource management using a resource group. For example, FIG. 2 illustrates a resource group context example 200 in which a plurality of shared resources are associated with multiple features. As illustrated in FIG. 2, a resource group context 205 may associate a number of features 210 with a resource group 235, which includes an instance of multiple resources 230.

To improve profile switching (e.g., switching between user profiles within the same user account) and/or provide additional functionality such as account switching (e.g., switching between different user accounts), the system 100 may be configured using resource grouped architecture. For example, the system 100 may generate multiple resource groups, with an individual resource group associated with a single instance of the resources 230. As used herein, a resource group refers to a container, which is a sandbox composed of resources 230 that are essential for features 210 associated with the resource group to execute commands and/or logic. For example, the resources 230 within a resource group 235 may provide data, state, and/or other information for the features 210 associated with the resource group 235. Thus, multiple features 210 may be associated with a single resource group 235 (e.g., multiple features 210 may run in one resource group) and share the same set of resources 230. For example, a first resource group 235a may be associated with a first plurality of features 210 and may include a token resource with which the features 210 may construct a network request. Thus, all of the first plurality of features 210 associated with the first resource group 235a may use the same token in a network request header.

As used herein, features 210 may correspond to components of an application that provide certain functionality. For example, a first feature 210a may correspond to a first component (e.g., first portion of programming code or first feature logic) of a first application, a second feature 210b may correspond to a second component (e.g., second portion of programming code or second feature logic) of the first application, and so on, although the disclosure is not limited thereto. Additionally or alternatively, the features 210 associated with the resource group 235 may correspond to multiple applications without departing from the disclosure. For example, a third feature 210c may correspond to a third component (e.g., third portion of programming code or third feature logic) of a second application. Thus, a feature 210 may correspond to specific feature logic and/or functionality provided by the application.

An application may correspond to a single feature 210 and/or multiple features 210 without departing from the disclosure. For example, in some examples a single application may correspond to multiple features 210. However, the disclosure is not limited thereto, and in other examples a single application may correspond to a single feature 210 without departing from the disclosure. Thus, a feature 210 may correspond to the application itself instead of an individual component of the application without departing from the disclosure.

To illustrate examples of features 210, application(s) may include a first feature configured to maintain contact data (e.g., contacts feature), a second feature configured to maintain calendar data (e.g., calendar feature), a third feature configured to enable purchases from a digital store or marketplace (e.g., store feature), a fourth feature configured to maintain settings data (e.g., settings feature), a fifth feature configured to enable a communication session with another device (e.g., communications feature), a sixth feature configured to enable voice commands or a speech interface (e.g., voice feature), a seventh feature configured to send and receive notification data (e.g., notification feature), and/or the like. However, the disclosure is not limited thereto and the device 110 may include additional features 210 not described above without departing from the disclosure.

For ease of illustration, the drawings may illustrate the features 210 using a limited number of examples, although the disclosure is not limited thereto. For example, while the device 110 may include a variety of different features 210, the following drawings may illustrate the features 210 using a contacts feature 312, a calendar feature 314, a store feature 316, and a settings feature 318, as described in greater detail below with regard to FIG. 3. However, the disclosure is not limited thereto and additional features 210 may be associated with a resource group 235 without departing from the disclosure.

As described above, individual applications may include any number of features 210 and two different applications may include different features 210 and/or a different number of features 210 without departing from the disclosure. Additionally or alternatively, in some examples two different applications may include similar features 210 (e.g., separate features that correspond to similar functionality) without departing from the disclosure. For example, a first application may include a first communication feature and a second application may include a second communication feature, which may have similar or overlapping functionality. However, despite the similar functionality, the device 110 may distinguish between these two features. For example, a single resource group 235 may be associated with a first feature 210a (e.g., first communication feature) corresponding to the first application and a second feature 210b (e.g., second communication feature) corresponding to the second application. Additionally or alternatively, the first communication feature may be associated with a first resource group 235a and the second communication feature may be associated with a second resource group 235b without departing from the disclosure.

As illustrated in FIG. 2, the resource group context example 200 illustrates an example of a resource group context 205 in which multiple features 210 are associated with a single resource group 235. For example, FIG. 2 illustrates that a first feature (Feature1) 210a, a second feature (Feature2) 210b, and a third feature (Feature3) 210c are associated with the resource group 235, although the disclosure is not limited thereto. As described above, the resource group 235 may include an instance of resources 230 that enable the features 210 to execute commands and/or logic. For example, the resource group 235 may maintain resources, data, states, and/or the like for the features 210 associated with the resource group 235. As illustrated in FIG. 2, the resource group 235 may include a first resource (Resource1) 230a, a second resource (Resource2) 230b, and a third resource (Resource3) 230c, although the disclosure is not limited thereto.

As used herein, resources 230 may correspond to a variety of different components, data, information, and/or the like. For example, the resources 230 may correspond to connected devices, files and folders or other data, network shares, processing power of a central processing unit (CPU) component, hardware capabilities of the device 110, and/or the like. In some examples, the resources 230 may correspond to hardware capabilities of the device 110 that can be employed, such as the CPU component, the network connection, and/or the like. Additionally or alternatively, the resources 230 may correspond to data that can be read or written, such as files, folders, and network shares. However, the disclosure is not limited thereto, and in some examples the resources 230 may correspond to connected peripherals that the device 110 can interact with, such as a camera, printer, scanner, etc.

For ease of illustration, the drawings may illustrate the resources 230 using a limited number of examples, although the disclosure is not limited thereto. For example, while the device 110 may include a variety of different resources 230, the following drawings may illustrate the resources 230 using a cache resource 332, a file system resource 334, a network access resource 336, and token management resource 338, as described in greater detail below with regard to FIG. 3. However, the disclosure is not limited thereto and additional resources 230 may be included in a resource group 235 without departing from the disclosure. In addition, while the drawings illustrate the same resources 230 in each resource group 235, the disclosure is not limited thereto and individual resources 230 and/or a number of resources 230 may vary between individual resource groups 235 without departing from the disclosure.

An individual resource group 235 may include a single instance of one or more resources 230. Thus, the device 110 may include multiple resource groups 235, resulting in multiple instances of a single resource 230, without departing from the disclosure. For example, a first resource group 235a may include a first instance of the cache resource 332a, a second resource group 235b may include a second instance of the cache resource 332b, and so on. As described above, two different resource groups 235 may include different resources 230 and/or a different number of resources 230 without departing from the disclosure.

Referring back to FIG. 2, the resource group context 205 illustrates that a plurality of features 210 (e.g., features 210a-210c) may be associated with the resource group 235. However, an individual feature 210 may only be associated with a single resource group 235 at a time, although this association may change over time. For example, the first feature 210a may be associated with a first resource group 235a at a first time and may be associated with a second resource group 235b at a second time.

As a plurality of features 210 are associated with an individual resource group 235 at a time, the resource group context 205 simplifies resource management 220 associated with the features 210. For example, the device 110 may include multiple resource groups 235 and can update and maintain each of the multiple resource groups 235 individually. Thus, the device 110 may update or reset the resources 230 for an individual feature 210 simply by associating the feature 210 with an appropriate resource group 235.

Using this resource grouped architecture, the system 100 may simplify the process of refreshing and/or resetting the resources 230 when switching a user profile and/or user account. Instead of requiring that each of the features 210 individually manage the resources 230 and/or requiring that all of the resources 230 be reset/refreshed each time the device 110 switches a user profile and/or user account, the resource grouped architecture enables the system 100 to manage the resources 230 for multiple features 210 associated with a single resource group 235. For example, the system 100 may identify a first plurality of features 210(1) that are associated with a first user profile and associate the first plurality of features 210(1) with a first resource group 235a, which includes a first set of resources 230(1) corresponding to the first user profile. If a user 5 switches to a second user profile, the system 100 may associate the first plurality of features 210(1) with a second resource group 235b, which includes a second set of resources 230(2) corresponding to the second user profile. Thus, the resource grouped architecture enables the system 100 to separately track multiple instances of the resources 230, such that the system 100 does not reset/refresh the resources 230 each time profile switching and/or account switching occurs. Instead, the system 100 may update each individual resource group 235 and change an association between the features 210 and the resource groups 235 on the current user profile and/or user account selected by the user 5.

In some examples, the device 110 may include a resource group 235 for each individual user profile and/or user account. For example, the device 110 may include a first resource group 235a for a first user profile associated with a first user account and may include a second resource group 235b for a second user profile associated with the first user account. The device 110 may switch a first plurality of features 210(1) from the first user profile to the second user profile by changing an association for the first plurality of features 210(1) from the first resource group 235a to the second resource group 235b (e.g., associating the first plurality of features 210(1) with the second resource group 235b).

As will be described in greater detail below with regard to FIGS. 4A-4C, in some examples the device 110 may include a third resource group 235c associated with the first user account and the device 110 may associate a second plurality of features 210(2) with the third resource group 235c. When the device 110 switches from the first user profile to the second user profile, which are both associated with the first user account, the device 110 does not need to change the association between the second plurality of features 210(2) and the third resource group 235c. Additionally or alternatively, the device 110 may include a fourth resource group 235d associated with a second user account. When the device 110 switches from the first user account to the second user account, the device 110 may switch the second plurality of features 210(2) from the first user account to the second user account by changing an association for the second plurality of features 210(2) from the third resource group 235c to the fourth resource group 235d (e.g., associating the second plurality of features 210(2) with the fourth resource group 235d).

As described above, while the system 100 may generate multiple resource groups 235 and multiple features 210 may be associated with a single resource group 235, each feature 210 is only associated with a single resource group 235 at a time. For example, a first feature (Feature1) 210a may be associated with the first resource group 235a corresponding to the first user profile. If the user 5 switches from the first user profile to the second user profile, the system 100 may change the association for the first feature (Feature1) 210a such that it is now associated with the second resource group 235b corresponding to the second user profile. Thus, while the first feature 210a is only associated with a single resource group 235 at a time, the first feature 210a may switch between multiple resource groups 235 over a period of time without departing from the disclosure.

By associating instances of the resources 230 with resource groups 235, the device 110 may simplify the process of resetting and/or refreshing the resources 230 and/or may reduce the frequency with which the resources 230 need to be reset and/or refreshed without departing from the disclosure. In some examples, the system 100 may reset, refresh, and/or update resources 230 for multiple features 210 by resetting, refreshing, and/or updating a single resource group 235. Thus, the resource grouped architecture reduces a complexity associated with updating the resources 230 during profile switching, account switching, and/or the like. Additionally or alternatively, the system 100 may reduce a frequency with which the resources 230 are refreshed and/or reset using the resource grouped architecture. For example, the system 100 may update first resources 230 (e.g., a first instance of the resources 230) associated with a first user profile in a first resource group 235a and may update second resources 230 (e.g., a second instance of the resources 230) associated with a second user profile in a second resource group 235b. When the device 110 performs profile switching to switch from the first user profile to the second user profile, the device 110 does not reset the resources 230 but instead switches appropriate features 210 from the first resource group 235a to the second resource group 235b.

The system 100 may associate a user profile with an individual user. For example, the system 100 may maintain a first user profile for the first user 5a and may associate information about the first user 5a with the first user profile. In some examples, the system 100 may store user preferences, settings, previous interactions or dialogs, user history, contextual information, and/or the like in association with the first user profile, although the disclosure is not limited thereto. Using the first user profile, the system 100 may personalize an interaction with the first user 5a to improve a user experience.

In some examples, multiple user profiles may be associated with a single user account. For example, a first user account may correspond to a household (e.g., family), such that first user profiles for all users in the household are associated with the first user account. In this example, the system 100 may store data (e.g., information, settings, and/or the like) that is common to the first user profiles in association with the first user account. However, the disclosure is not limited thereto and in other examples, the first user account may correspond to a business or other organization, such that second user profiles for all users in the business/organization are associated with the first user account. In this example, the system 100 may store data (e.g., information, settings, and/or the like) that is common to the second user profiles in association with the first user account.

As used herein, profile switching refers to a process in which the system 100 enables a user 5 to switch from a first user profile to a second user profile associated with the same user account without signing out of an application. Typically, conventional systems switch user profiles by requiring that the user 5 sign out of the application, sign back in, and then select a different user profile. This process disrupts a user experience with the application in order to ensure that all resources are reset/refreshed for the new user profile. In contrast, the system 100 may perform profile switching without requiring the user 5 to sign out of the application by simply replacing a first association between first feature(s) (e.g., features of the application that are associated with an individual user profile) and the first resource group 235a (e.g., first user profile) with a second association between the first feature(s) and the second resource group 235b (e.g., second user profile).

As used herein, account switching refers to a process in which the system 100 enables a user 5 to switch from a first user account to a second user account without signing out of an application. Typically, conventional systems switch user accounts by requiring that the user 5 sign out of the application, sign back in, and then select a different user account. This process disrupts a user experience with the application in order to ensure that all resources are reset/refreshed for the new user account. In contrast, the system 100 may perform account switching without requiring the user 5 to sign out of the application by simply replacing a third association between second feature(s) (e.g., features of the application that are associated with an individual user account) and the third resource group 235c (e.g., first user account) with a fourth association between the second feature(s) and the fourth resource group 235d (e.g., second user account).

As described in greater detail below with regard to FIG. 4C-6, account switching may enable additional functionality to improve a user experience, which may be referred to as care mode. For example, activating care mode enables a first user 5a (e.g., care giver) associated with a first user account to log in using a second user account associated with a second user 5b (e.g., care recipient). This enables the first user 5a to input commands or perform actions on behalf of the second user 5b without requiring that the first user 5a sign out of the first user account. In some examples, the first user 5a may alternate between inputting first commands or perform first actions on behalf of the first user 5a and inputting second commands or perform second actions on behalf of the second user 5b without departing from the disclosure.

Figure 3:
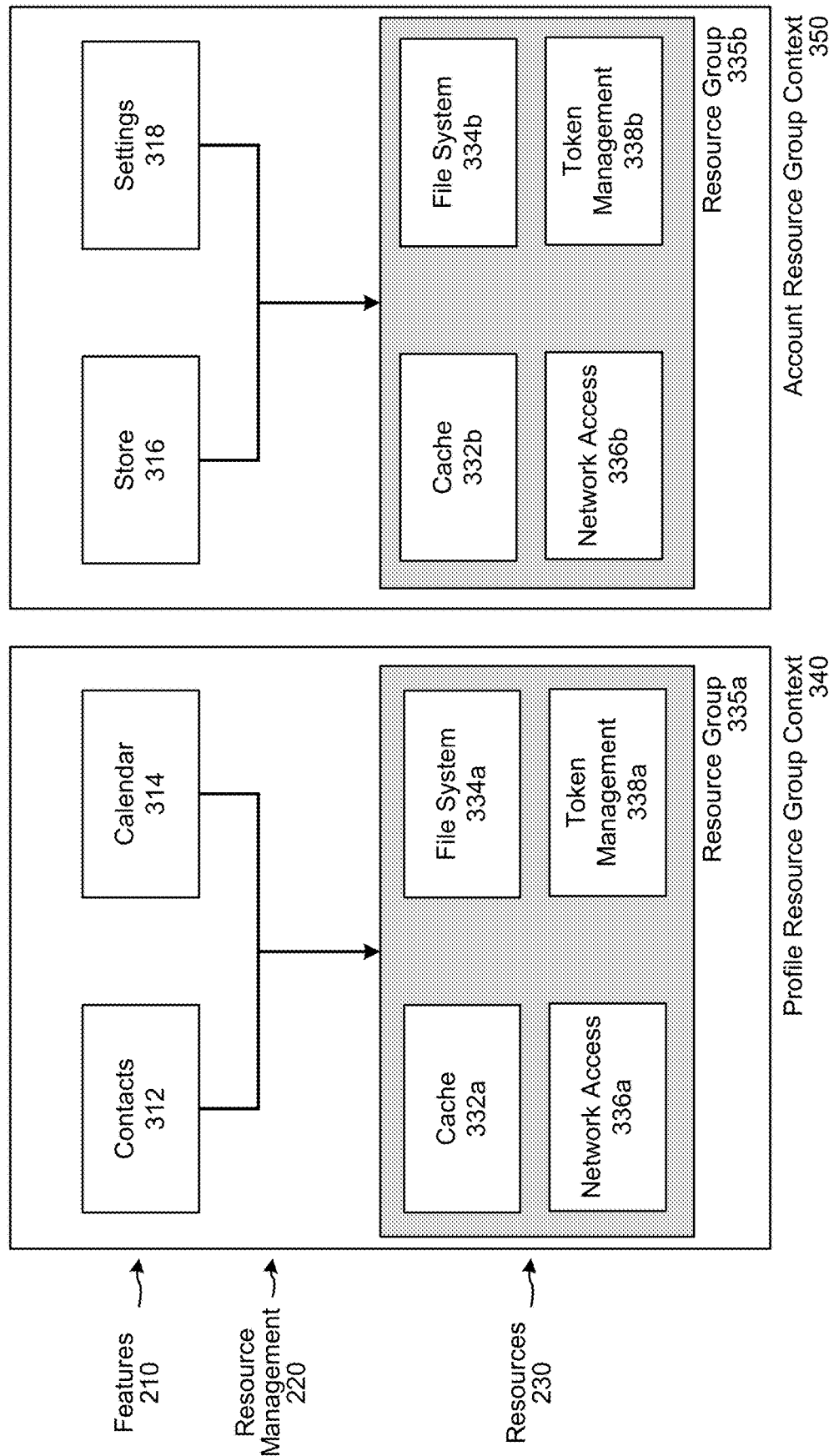
FIG. 3 illustrates an example of resource management using resource groups.

FIG. 3 illustrates a resource group context example 300 that utilizes the resource grouped architecture. As illustrated in FIG. 3, the system 100 may associate a first plurality of features with a profile resource group context 340 and may associate a second plurality of features with an account resource group context 350.

The first plurality of features may include features 210 that are associated with an individual user profile. For example, the first plurality of features may perform functionality that is personalized to an individual user profile (e.g., profile dependent features). To illustrate an example, the device 110 may associate the first plurality of features with a first resource group corresponding to a first user profile associated with a first user account. When switching to a second user profile associated with the first user account, the device 110 may associate the first plurality of features with a second resource group corresponding to the second user profile.

In contrast, the second plurality of features may include features 210 that are associated with an individual user account. For example, the second plurality of features may perform functionality that is general to the first user account (e.g., account dependent features). When switching to the second user profile associated with the first user account, the device 110 may maintain an association between the second plurality of features and a third resource group associated with the first user account. However, when switching to a second user account, the device 110 may associate the second plurality of features with a fourth resource group corresponding to the second user account.

In the resource group context example 300 illustrated in FIG. 3, a contacts feature 312 and a calendar feature 314 are examples of profile dependent features that are associated with a first resource group 335a in the profile resource group context 340. Meanwhile, a store feature 316 and a settings feature 318 are examples of account dependent features that are associated with a second resource group 335b in the account resource group context 350. However, the disclosure is not limited thereto and the profile resource group context 340 and/or the account resource group context 350 may include additional features 210 without departing from the disclosure.

As described in greater detail above with regard to FIG. 2, the first resource group 335a may include a first instance of resources 230 and the second resource group 335b may include a second instance of resources 230. For example, the first resource group 335a may include a first cache resource 332a, a first file system resource 334a, a first network access resource 336a, and a first token management resource 338a. Similarly, the second resource group 335b may include a second cache resource 332b, a second file system resource 334b, a second network access resource 336b, and a second token management resource 338b.

For ease of illustration, FIG. 3 illustrates an example in which the first resource group 335a and the second resource group 335b include separate instances of the same resources 230. However, the disclosure is not limited thereto, and the first resource group 335a and the second resource group 335b may include different resources 230 without departing from the disclosure. Additionally or alternatively, the first resource group 335a and the second resource group 335b may include additional resources 230 not illustrated in FIG. 3 without departing from the disclosure.

If the system 100 performs profile switching to switch to a second user profile, the system 100 may update the profile resource group context 340 such that the contacts feature 312 and the calendar feature 314 are associated with a new resource group corresponding to the second user profile. Additionally or alternatively, if the system 100 performs account switching to switch to a second user account, the system 100 may update the account resource group context 350 such that the store feature 316 and the settings feature 318 are associated with a new resource group corresponding to the second user account. Thus, when performing profile switching within a single user account, the system 100 may only update the profile resource group context 340 while maintaining the account resource group context 350. In contrast, when performing account switching, the system 100 may update both the profile resource group context 340 and the account resource group context 350 based on the new user profile and the new user account.

FIGS. 4A-4C illustrate examples of profile switching, account switching, and care mode resource groups. As described in greater detail above, the system 100 may associate a user profile with an individual user. For example, the system 100 may maintain a first user profile for the first user 5a and may associate information about the first user 5a with the first user profile. The first user profile enables the system 100 to personalize an interaction with the first user 5a to improve a user experience. In addition, the system 100 may group multiple user profiles together by associating them with a single user account. For example, a first user account may correspond to a household, business, organization, and/or the like and may be associated with a plurality of user profiles. The system 100 may maintain the first user account by associating information common to two or more of the plurality of user profiles with the first user account.

As described in greater detail above, the system 100 may maintain an individual resource group for each user profile and/or user account. To illustrate an example, the first user 5a may be associated with a first user profile corresponding to a first user account, the second user 5b may be associated with a second user profile corresponding to a second user account, and a third user 5c may be associated with a third user profile corresponding to the first user account. In this example, the system 100 may maintain five unique resource groups; a first resource group associated with the first user profile, a second resource group associated with the first user account, a third resource group associated with the second user profile, a fourth resource group associated with the second user account, and a fifth resource group associated with the third user profile.

A first plurality of features may include features 210 that are associated with an individual user profile. For example, the first plurality of features may perform functionality that is personalized to an individual user profile (e.g., profile dependent features). Thus, the system 100 may update a resource group associated with the first plurality of features whenever the system 100 switches user profiles (e.g., performs profile switching or account switching). A second plurality of features may include features 210 that are associated with an individual user account. For example, the second plurality of features may perform functionality that is personalized to an individual user account (e.g., account dependent features). Thus, the system 100 may update a resource group associated with the second plurality of features whenever the system 100 switches user accounts (e.g., performs account switching), while maintaining the current resource group when the system 100 switches user profiles (e.g., performs profile switching).

In some examples, the device 110 may perform profile switching 400 to switch from a first user profile to another user profile associated with a first user account (e.g., third user profile). For example, FIG. 4A illustrates that some features 210 (e.g., first feature 210a, second feature 210b, and third feature 210c) are profile dependent features that are associated with a first user profile at a first time. As illustrated in FIG. 4A, the first user profile is represented using a first profile identification (PID1) 425 and the first user profile corresponds to a first user account (e.g., first account identification (AID1) 420). Thus, the device 110 may associate the features 210 with the first resource group associated with the first user profile PID1 425.

As illustrated in FIG. 4A, the device 110 may perform profile switching 400 to switch from the first user profile to the third user profile associated with the first user account. For example, FIG. 4A illustrates an example in which the device 110 associates the features 210 with another profile identification (PID0) 427 that also corresponds to the first user account AID1 420. Thus, the system 100 performed the profile switching 400 by associating the features 210 with the other user profile PID0 427 instead of the first user profile PID1 425 (e.g., associating the features 210 with the fifth resource group associated with the third user profile instead of the first resource group).

While not illustrated in FIG. 4A, some of the features 210 may be account dependent features that are associated with the first user account at the first time. While performing profile switching 400, the device 110 may maintain the association between these features and the second resource group associated with the first user account.

In contrast, FIG. 4B illustrates an example of performing account switching 430 to switch from the first user profile corresponding to the first user account to a second user profile corresponding to the second user account. As illustrated in FIG. 4B, the device 110 may associate the features 210 with the first user profile PID 425 and/or the first user account AID 420 at a first time. Thus, the device 110 may associate the features 210 with the first resource group associated with the first user profile PID 425 and/or the second resource group associated with the first user account AID 420 without departing from the disclosure.

As illustrated in FIG. 4B, the device 110 may perform account switching 430 to switch from the first user account AID 420 to a second user account AID2 440. For example, FIG. 4B illustrates an example in which the device 110 associates the features 210 with a second user profile PID2 445 that corresponds to the second user account AID2 440 instead of associating the features with the first user profile PID1 425 corresponding to the first user account AID 420. Thus, the system 100 performed account switching 430 by associating the features 210 with the third resource group associated with the second user profile PID2 445 and/or the fourth resource group associated with the second user account AID2 440 without departing from the disclosure.

In some examples, the system 100 may enable the device 110 to associate the features 210 with multiple resource groups corresponding to multiple user profiles and/or multiple user accounts at the same time. For example, the first user 5a may activate care mode to improve a user experience and perform additional functionality. When care mode is activated, the system 100 may enable the first user 5a to switch between performing first actions using the first user profile/first user account that are associated with the first user 5a and performing second actions using the second user profile/second user account that are associated with the second user 5b.

FIG. 4C illustrates an example of activating care mode using care mode resource groups 450. For example, first features 210A may be associated with a first resource group corresponding to the first user profile PID1 425. As illustrated in FIG. 4C, the first resource group is represented by a first container identification CID1 (PID1) 460a associated with the first user profile PID1. In addition, FIG. 4C illustrates that second features 210B may be associated with a second resource group corresponding to the first user account AID 420. As illustrated in FIG. 4C, the second resource group is represented by a second container identification CID2 (AID1) 460b associated with the first user account AID1.

When care mode is active, third features 210C may be associated with a third resource group corresponding to the second user profile PID2 445. As illustrated in FIG. 4C, the third resource group is represented by a third container identification CID3 (PID2) 460c associated with the second user profile PID2. In addition, FIG. 4C illustrates that fourth features 210D may be associated with a fourth resource group corresponding to the second user account AID2 440. As illustrated in FIG. 4C, the fourth resource group is represented by a fourth container identification CID4 (AID2) 460d associated with the second user account AID2.

Thus, using the resource groups 460 illustrated in FIG. 4C, the system 100 may update resources 230 associated with the resource groups 460 and/or associate the features 210 with any of the resource groups 460 in order to perform actions using the first user profile/first user account or the second user profile/second user account. While FIG. 4C only illustrates an example in which the care mode resource groups 450 include two user profiles and two user accounts, the disclosure is not limited thereto and a first number of user profiles and/or a second number of user accounts may vary without departing from the disclosure.

As illustrated in FIG. 4C, the first user profile PID1 425 may be referred to as a first user profile (e.g., care giver profile) and the first user account AID 420 may be referred to as a first account (e.g., care giver account), while the second user profile PID2 445 may be referred to as a second user profile (e.g., care recipient profile) and the second user account AID2 440 may be referred to as a second account (e.g., care recipient account). When care mode is not active (e.g., inactive), all of the features 210 may be associated with the first user 5a (e.g., care giver). For example, the first features 210A and the third features 210C will be associated with the first resource group CID1 (PID1) 460a (e.g., care giver profile), while the second features 210B and the fourth features 210D will be associated with the second resource group CID2 (AID1) 460b (e.g., care giver account) when care mode is inactive.

When care mode is active, however, some of the features 210 are associated with the first user 5a (e.g., care giver) and some of the features are associated with the second user 5b (e.g., care recipient). For example, the first features 210A and the second features 210B are care mode agnostic 470 and therefore will remain associated with the first resource group CID1 (PID1) 460a (e.g., care giver profile) and the second resource group CID2 (AID1) 460b (e.g., care giver account), respectively. Thus, the system 100 may associate certain features 210 with the first user 5a even when care mode is active in order to improve a user experience. For example, the first user 5a may continue to receive notifications, incoming communications or messages, and/or the like while care mode is active.

In contrast, when care mode is active the third features 210C and the fourth features 210D are care mode aware 475 and therefore are associated with the third resource group CID3 (PID2) 460c (e.g., care recipient profile) and the fourth resource group CID4 (AID2) 460d (e.g., care recipient account), respectively. Thus, the system 100 may associate certain features 210 with the second user 5b when care mode is active in order to enable additional functionality for the first user 5a. For example, the first user 5a may generate input commands as though the input commands originated at the second user profile and/or second account, enabling the first user 5a to perform actions on behalf of the second user 5b.

FIG. 5 illustrates an example of a first user (e.g., care giver) performing account switching. As illustrated in FIG. 5, the first user 5a (e.g., care giver) may perform some actions using the first user profile PID1 425 and/or the first user account AID1 420 associated with the first user 5a. For example, when care mode off/agnostic conditions 510 are present, the device 110 may perform first actions on behalf of the first user 5a. As described above, the device 110 may perform all actions on behalf of the first user 5a when care mode is inactive. However, when care mode is active, the device 110 may perform care mode agnostic actions on behalf of the first user 5a. For example, the device 110 may perform first actions corresponding to the first features 210A or the second features 210B, which are care mode agnostic 470.

As illustrated in FIG. 5, the first user 5a may perform other actions using the second user profile PID2 445 and/or the second user account AID2 440 associated with the second user 5b (e.g., care recipient). For example, when care mode on/aware conditions 520 are present, the device 110 may perform second actions on behalf of the second user 5b. Thus, when care mode is active, the device 110 may perform care mode aware actions on behalf of the second user 5b. For example, the device 110 may perform second actions corresponding to the third features 210C or the fourth features 210D, which are care mode aware 475.

FIG. 6 illustrates examples of resource groups enabling a care giver to perform profile switching and/or account switching. As illustrated in FIG. 6, care mode resource group example 600 indicates how the system 100 selects associated resource groups 610 when care mode is on or off.

As used herein, features that are care mode agnostic 470 remain associated with the first user 5a (e.g., either the first user profile PID1 425 or the first account AID1 420) regardless of whether care mode is active or inactive. For example, the first user 5a may continue to receive notifications, incoming communications or messages, and/or the like while care mode is active. In this example, the system 100 associates a first plurality of profile dependent features (e.g., profile level features) that are care mode agnostic 470 with the first user profile PID1 425 even when care mode is active. Similarly, the system 100 associates a second plurality of account dependent features (e.g., account level features) that are care mode agnostic 470 with the first account AID 420 even when care mode is active.

As used herein, care mode aware 475 features are associated with the first user 5a (e.g., either the first user profile PID 425 or the first account AID 420) when care mode is inactive but become associated with the second user 5b (e.g., either the second user profile PID2 445 or the second account AID2 440) when care mode is active. For example, the first user 5a may generate input commands as though the input commands originated at the second user profile PID2 445 or the second account AID2 440 when care mode is active, enabling the first user 5a to perform actions on behalf of the second user 5b. In this example, the system 100 associates a third plurality of profile dependent features (e.g., profile level features) that are care mode aware 475 with the first user profile PID1 425 when care mode is inactive and with the second user profile PID2 445 when care mode is active. Similarly, the system 100 associates a fourth plurality of account dependent features (e.g., account level features) that are care mode aware 475 with the first account AID 420 when care mode is inactive and with the second account AID2 440 when care mode is active.

As illustrated in FIG. 6, for account level features (e.g., features associated with multiple user profiles for a single user account), the system 100 may distinguish between features that are care mode agnostic 470 and features that are care mode aware 475. For example, when care mode is on/active, the system 100 may associate the second plurality of account level features that are care mode agnostic 470 with the first user account AID 420 but may associate the fourth plurality of account level features that are care mode aware 475 with the second user account AID2 440. Meanwhile, when care mode is off/inactive, the system 100 may associate both the second plurality of account level features and the fourth plurality of account dependent level with the first user account AID 420.

Similarly, for profile level features (e.g., features associated with a single user profile for a single user account), the system 100 may distinguish between features that are care mode agnostic 470 and features that are care mode aware 475. For example, when care mode is on/active, the system 100 may associate the first plurality of profile level features that are care mode agnostic 470 with the first user profile PID 425 but may associate the third plurality of profile level features that are care mode aware 475 with the second user profile PID2 445. Meanwhile, when care mode is off/inactive, the system 100 may associate both the first plurality of profile level features and the third plurality of profile level features with the first user profile PID1 425.

FIGS. 7A-7B illustrate examples of resource groups associated with profile switching. FIG. 7A illustrates a profile switching example 700 in which the device 110 switches from a first user profile corresponding to the first user account to a third user profile corresponding to the first user account. As illustrated in FIG. 7A, a first plurality of features (e.g., first feature 210*a*, second feature 210*b*, and third feature 210*c*) are account level features that are associated with a first resource group <AID1> 710 corresponding to the first user account AID 420. Meanwhile, a second plurality of features (e.g., fourth feature 210*d*, fifth feature 210*e*, and sixth feature 210*f*) are profile level features that are associated with a second resource group <PID1> 715 corresponding to the first user profile PID1 425.

When the device 110 determines to switch a user profile 720, the device 110 may maintain the association between the first plurality of features (e.g., account level features) and the first resource group <AID1> 710 corresponding to the first user account AID 420. However, the device 110 may associate the second plurality of features (e.g., profile level features) with a third resource group <PID0> 725 corresponding to the other user profile PID0 427.

FIG. 7B illustrates a care mode example 730 in which the device 110 activates a care mode to enable additional functionality, such as enabling the first user 5*a* to input commands on behalf of the second user 5*b*. As illustrated in FIG. 7B, when care mode is inactive, the first plurality of features (e.g., account level features) are associated with the first resource group <AID1> 710 and the second plurality of features (e.g., profile level features) are associated with the second resource group <PID1> 715, as described above with regard to FIG. 7A.

When the device 110 determines to activate care mode 735, the device 110 may maintain the association between account level care mode agnostic features (e.g., first feature 210*a*) and the first resource group <AID1> 710 and may maintain the association between profile level care mode agnostic features (e.g., fourth feature 210*d*) and the second resource group <PID1> 715. However, when the device 110 determines to activate care mode 735, the device 110 may associate account level care mode aware features (e.g., second feature 210*b* and third feature 210*c*) with a fourth resource group <AID2> 740 corresponding to the second user account AID2 440 and may associate profile level care mode aware features (e.g., fifth feature 210*e* and sixth feature 210*f*) with a fifth resource group <PID2> 745 corresponding to the second user profile PID2 445.

FIG. 8 illustrates an example of resource grouped architecture using a resource group as a resource boundary. As illustrated in FIG. 8, in some examples the device 110 may implement resource grouped architecture using a container as a resource boundary. For example, FIG. 8 illustrates a resource group as resource boundary example 800 in which a resource group management component 820 receives a GetResourceAccessor 810 request that indicates a feature name.

The resource group management component 820 may be a component for managing resource groups (e.g., containers) and may be configured to expose an application programming interface (API) that enables features to request and receive a resource accessor. As illustrated in FIG. 8, the resource group management component 820 may include a first component represented as GetResourceAccessor API 822 and a second component represented as resource group selector 824. The GetResourceAccessor API 822 may be maintained centrally in the resource group management component 820 and the features may be configured to invoke the GetResourceAccessor API 822 in order to request a particular resource accessor handler. Input data to the GetResourceAccessor API 822 may include a feature name and a resource accessor name, and an output of the GetResourceAccessor API 822 may be a resource accessor handler.

The GetResourceAccessor API 822 may receive the GetResourceAccessor 810 request, which indicate a feature name, and may determine which resource group the feature name is associated with by invoking the resource group selector 824. If the expected resource group is absent, the resource group selector 824 may initialize the resource group and add the new resource group to the resource group pool 840. After the resource group is located, the resource group selector 824 may invoke the GetResourceAccessor API 822 of the resource group instance, which will return the accessor. In some examples, the resource group selector 824 may rely on a feature registry component 830 and an application context component 835 to determine a resource group associated with a particular feature at a particular time. For example, the feature registry component 830 may be configured to store one or more resource groups within which an individual feature is configured to run in a particular application context. The application context may indicate whether care mode is on or off, although the disclosure may vary and the application context may vary across applications. The resource group selector 824 may receive an input indicating a feature registry, a feature name, and an application context and may output a resource group instance corresponding to the input.

The resource group pool 840 may hold all of the resource group instances 845. For example, the resource group pool 840 may include a first resource group instance 845*a*, a second resource group instance 845*b*, etc. In some examples, an application may place restrictions on the resource group pool 840, such as size restrictions, an eviction policy, and/or the like, although the disclosure is not limited thereto. A resource group instance 845 may correspond to an instance of the resource group that may hold resource accessor instances and resources.

A resource group instance 845 may communicate with a resource accessor registry 850 to maintain a resource accessor name and a resource accessor instance handler. The resource accessors 860 may be configured to expose APIs for accessing a particular resource 230. For example, a cache accessor 862 may be configured to access the cache resource 332 and may retrieve values stored in the cache resource 332 (e.g., GetValue, SetValue APIs, etc.). FIG. 8 illustrates a cache accessor 862 configured to access the cache resource 332, a file accessor 864 configured to access the file system resource 334, a network accessor 866 configured to access the network access resource 336, and a token accessor 868 configured to access the token management resource 338, although the disclosure is not limited thereto.

In the resource group as resource boundary example 800, the features 210 are configured to interact with the resource accessors 860 directly. For example, when a feature 210 attempts to access a resource 230, the feature 210 gets a resource accessor handler from the GetResourceAccessor API and then invokes the APIs exposed by the resource accessor 860 directly. Resource group selection and management is hidden from the features 210, such that switching resource groups is transparent to the features 210.

Figure 9:
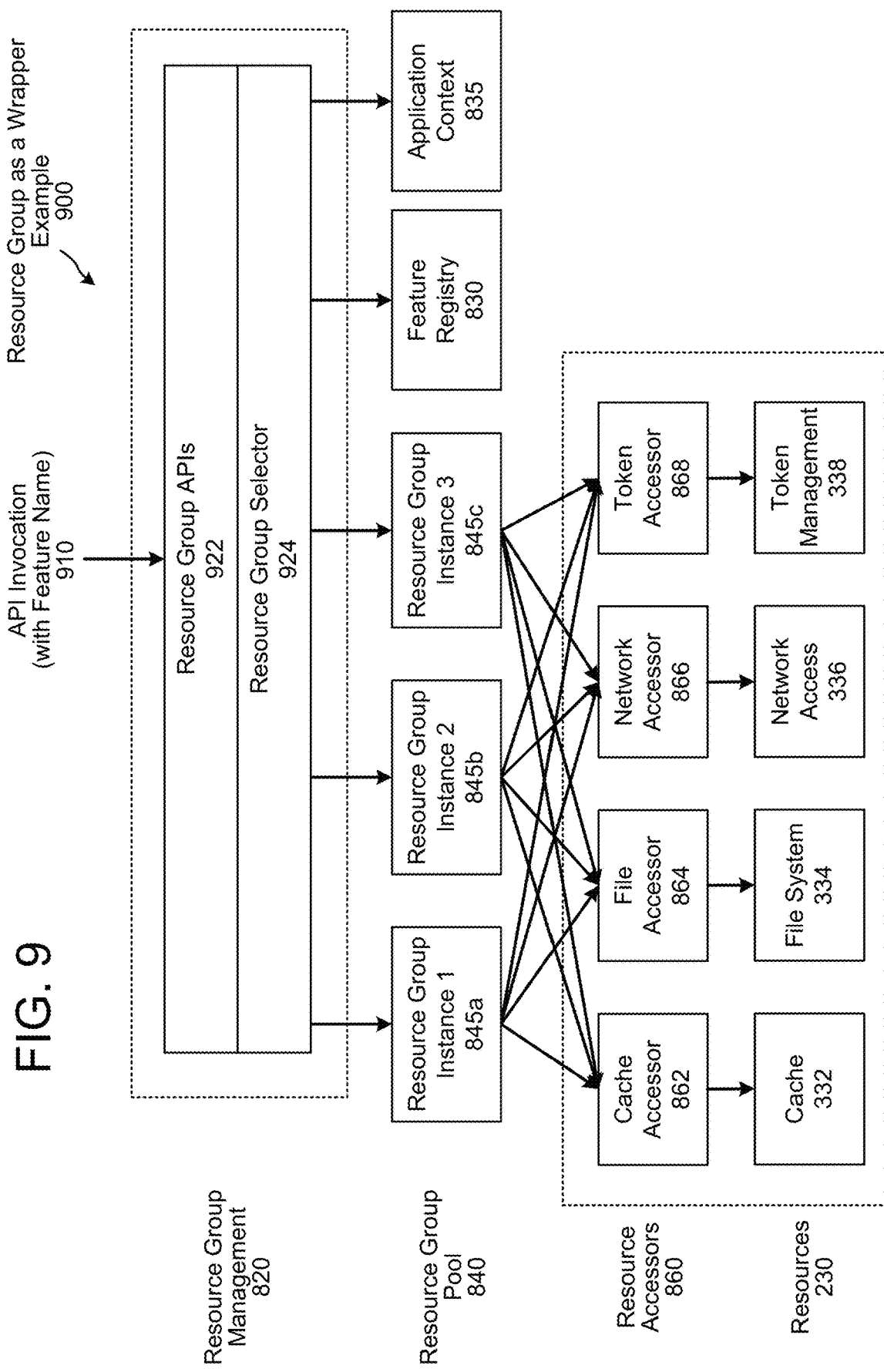
FIG. 9 illustrates an example of resource grouped architecture using a resource group as a wrapper.

FIG. 9 illustrates an example of resource grouped architecture using a resource group as a wrapper. As FIG. 9 includes several components described in greater detail above with regard to FIG. 8, for ease of illustration a redundant description is omitted.

FIG. 9 illustrates a resource group as a wrapper example 900. Instead of exposing the GetResourceAccessor API 822, the resource group as a wrapper example 900 illustrates an example in which the resource group management component 820 exposes a full set of resource accessor APIs (e.g., GetCacheValue, SetCacheValue, GetToken, etc.). For example, the resource group management component 820 may receive an API invocation 910 that indicates a feature name. The resource group management component 820 may include resource group APIs 922 and a resource group selector 924.

When a feature 210 attempts to access a particular resource, the feature 210 may invoke a request (e.g., getCacheValue) to the resource group management component 820. The resource group selector 924 may determine a resource group for the feature 210, the resource group management component 820 may invoke one of the resource group APIs 922 (e.g., getCacheValue API) of the resource group, and the resource group may retrieve a value corresponding to the request (e.g., getvalue API associated with the cache accessor 862).

In contrast to the example illustrated in FIG. 8, the resource group as a wrapper example 900 illustrates that the resource group and/or the resource group management component 820 need to be aware of the resource accessor APIs.

Figure 10:
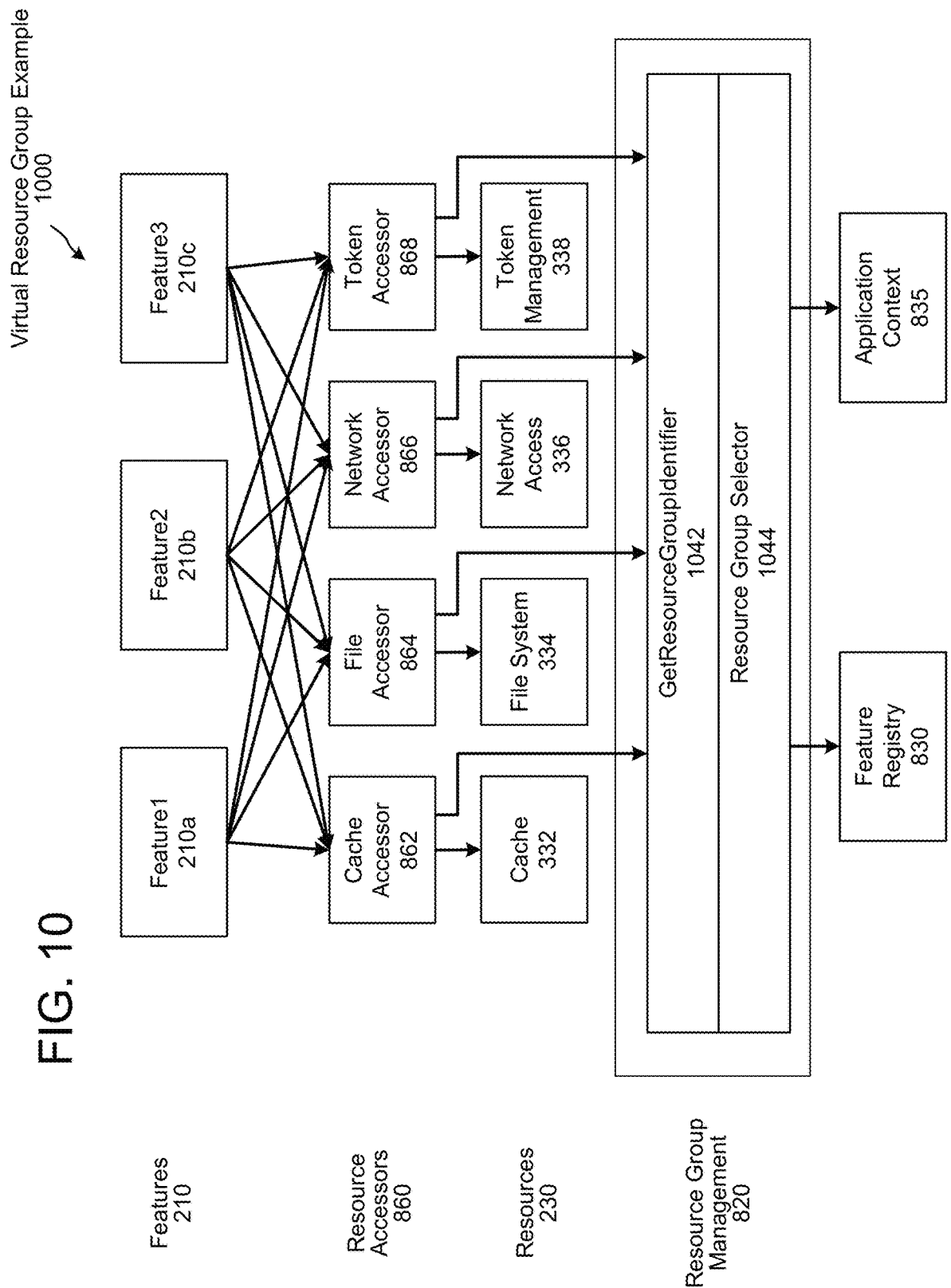
FIG. 10 illustrates an example of resource grouped architecture using a virtual resource group.

FIG. 10 illustrates an example of resource grouped architecture using a virtual resource group. As FIG. 10 includes several components described in greater detail above with regard to FIG. 8, for ease of illustration a redundant description is omitted.

FIG. 10 illustrates a virtual resource group example 1000 in which there are no physical resource group instances nor resource group pool. As illustrated in FIG. 10, the features 210 may communicate with resource accessors 860, and the resource accessors 860 may communicate with the resources 230. However, the resource accessors 860 may also communicate with the resource group management component 820 to identify an address associated with the resources 230.

As illustrated in FIG. 10, in the virtual resource group example 1000 the resource group management component 820 may include a first component labeled GetResource-GroupIdentifier 1042 and a second component labeled Resource Group Selector 1044. The resource group management component 820 may respond to a query from a feature 210 indicating the resource group within which the feature 210 is running. In some examples, the resource group selector 1044 may determine the resource group within which the feature 210 is running. As described above, the resource group selector 1044 may communicate with the feature registry 830 and the application context 835 to determine within which resource group the feature is running at a particular time.

In the virtual resource group example 1000, the resource accessors 860 are resource group aware. When a feature 210 needs to access a resource 230, the feature 210 may interact with the resource accessor 860 corresponding to the resource 230.

FIG. 11 illustrates a communication diagram to enable profile switching for voice commands using context data. As illustrated in FIG. 11, the first device 110*a* may activate (1110) a care mode (e.g., turn on care mode). For example, the first device 110*a* may initially be associated with the first user profile and may receive an input command to activate the care mode. When care mode is active, the first device 110*a* may be associated with the first user profile corresponding to the first user 5*a* and the second user profile corresponding to the second user 5*b*. In some examples, the first device 110*a* may be associated with additional user profiles when care mode is active, although the disclosure is not limited thereto.

Additionally or alternatively, when care mode is active, the system 100 may determine that the first user profile is granted permission(s) associated with the second user profile and may process input commands received from the first user profile using either the first user profile or the second user profile. For ease of illustration, FIG. 11 refers to the first user profile corresponding to the first user 5*a* and the second user profile corresponding to the second user 5*b*. However, the disclosure is not limited thereto, and in other examples the system 100 may determine that the first user account is granted permission(s) associated with the second user account and may process input commands received from the first user account using either the first user account or the second user account without departing from the disclosure.

The first device 110*a* may generate (1112) audio data and may send (1114) the audio data to the remote system 120 along with an indication that care mode is currently active. For example, the first device 110*a* may capture a voice command using a microphone and may generate the audio data representing the voice command. The remote system 120 may process (1116) the audio data to determine a command represented in the audio data and the system 100 may cause (1118) an action to be performed using the second user profile associated with care mode. Thus, the system 100 may process a voice command received from the first user 5*a* and perform an action responsive to the voice command using the second user profile, enabling the first user 5*a* to perform an action on behalf of the second user 5*b*.

While FIG. 11 illustrates the system 100 causing the action to be performed using the second user profile, the disclosure is not limited thereto and in some examples the system 100 causes the action to be performed using the second user account without departing from the disclosure.

FIG. 12 illustrates a communication diagram to enable profile switching for voice commands using event data. As illustrated in FIG. 12, the first device 110 may activate (1210) a care mode (e.g., turn on care mode). For example, the first device 110*a* may initially be associated with the first user profile and may receive an input command to activate the care mode. When care mode is active, the first device 110*a* may be associated with the first user profile corresponding to the first user 5*a* and the second user profile corresponding to the second user 5*b*. In some examples, the first device 110a may be associated with additional user profiles when care mode is active, although the disclosure is not limited thereto.

Additionally or alternatively, when care mode is active, the system 100 may determine that the first user profile is granted permission(s) associated with the second user profile and may process input commands received from the first user profile using either the first user profile or the second user profile. For ease of illustration, FIG. 12 refers to the first user profile corresponding to the first user 5a and the second user profile corresponding to the second user 5b. However, the disclosure is not limited thereto, and in other examples the system 100 may determine that the first user account is granted permission(s) associated with the second user account and may process input commands received from the first user account using either the first user account or the second user account without departing from the disclosure.

The first device 110a may send (1212) event data to the remote system 120 indicating that care mode is active, and the remote system 120 may store (1214) an indication that care mode is active. For example, the first device 110a may send a notification indicating that the first device 110a activated care mode to enable the remote system 120 to process voice commands using care mode.

As illustrated in FIG. 12, the second device 110b may detect (1216) a wakeword, generate (1218) audio data representing an utterance, and send (1220) the audio data to the remote system 120. For example, the second device 110b may include a wakeword engine configured to detect the wakeword, as described in greater detail below. After detecting the wakeword, the second device 110b may generate the audio data representing the utterance using a microphone.

The remote system 120 may determine (1222) that care mode is active and may process (1224) the audio data to determine a command responsive to the utterance, and the system 100 may cause (1226) an action to be performed using the second user profile associated with care mode. Thus, the system 100 may process a voice command received from the first user 5a and perform an action responsive to the voice command using the second user profile, enabling the first user 5a to perform an action on behalf of the second user 5b.

While FIG. 12 illustrates the system 100 causing the action to be performed using the second user profile, the disclosure is not limited thereto and in some examples the system 100 causes the action to be performed using the second user account without departing from the disclosure.

FIG. 13 illustrates a communication diagram for processing a voice command and identifying an output profile with which to perform an action. As illustrated in FIG. 13, the remote system 120 may store (1310) an indication that the first user profile is configured for care mode. For example, the remote system 120 may store an indication that the first user profile is granted permission(s) associated with the second user profile and may process input commands received from the first user profile using either the first user profile or the second user profile. Additionally or alternatively, the system 100 may store an indication that the first user account is granted permission(s) associated with the second user account and may process input commands received from the first user account using either the first user account or the second user account without departing from the disclosure. In some examples, the indication may indicate additional user profiles and/or user accounts for which the first user profile is granted permission(s), although the disclosure is not limited thereto.

As illustrated in FIG. 13, the second device 110b may detect (1312) a wakeword, generate (1314) audio data representing an utterance, and send (1316) the audio data to the remote system 120. For example, the second device 110b may include a wakeword engine configured to detect the wakeword, as described in greater detail below. After detecting the wakeword, the second device 110b may generate the audio data representing the utterance using a microphone.

The remote system 120 may process (1318) the audio data to determine a command responsive to the utterance and may determine (1320) that the command corresponds to care mode. For example, the remote system 120 may determine that the command is directed to the second user profile, second user account, and/or additional user profiles/accounts for which the first user profile is granted permission(s) during care mode.

The system 100 may cause (1322) an action to be performed using the second user profile associated with care mode. Thus, the system 100 may process a voice command received from the first user 5a and perform an action responsive to the voice command using the second user profile, enabling the first user 5a to perform an action on behalf of the second user 5b. While FIG. 13 illustrates the system 100 causing the action to be performed using the second user profile, the disclosure is not limited thereto and in some examples the system 100 causes the action to be performed using the second user account without departing from the disclosure.

FIG. 14 illustrates a communication diagram for generating a graphical interface representing a dashboard in response to a voice command. Whereas step 1322 of FIG. 13 is directed to causing an action to be performed using the second user profile (e.g., on behalf of the second user 5b), FIG. 14 is directed to a different example in which the first user 5a requests that a dashboard or other graphical interface is displayed on the first device 110a.

As illustrated in FIG. 14, the remote system 120 may store (1310) the indication that the user profile is configured for care mode, the second device 110b may detect (1312) the wakeword, generate (1314) the audio data, and send (1316) the audio data to the remote system 120, and the remote system 120 may process (1318) the audio data to determine a command, as described above with regard to FIG. 13.

After determining the command, the remote system 120 may determine (1410) that the command corresponds to a request to activate the care mode and may send (1412) activity data associated with the second user profile to the first device 110a. The first device 110a may activate (1414) care mode and display (1416) activity data using a care mode interface on a display of the first device 110a. For example, the first device 110a may display a dashboard illustrating information about the second user profile, such as a summary of recent activity or other highlights.

While FIG. 14 illustrates an example in which the remote system 120 sends the activity data to the first device 110a, the disclosure is not limited thereto. In some examples, the remote system 120 may send the activity data to the second device 110b and the second device 110b may activate the care mode and display the activity data without departing from the disclosure. Additionally or alternatively, the remote system 120 may send the activity data to both the first device 110a and the second device 110b without departing from the disclosure.

Figure 15A:
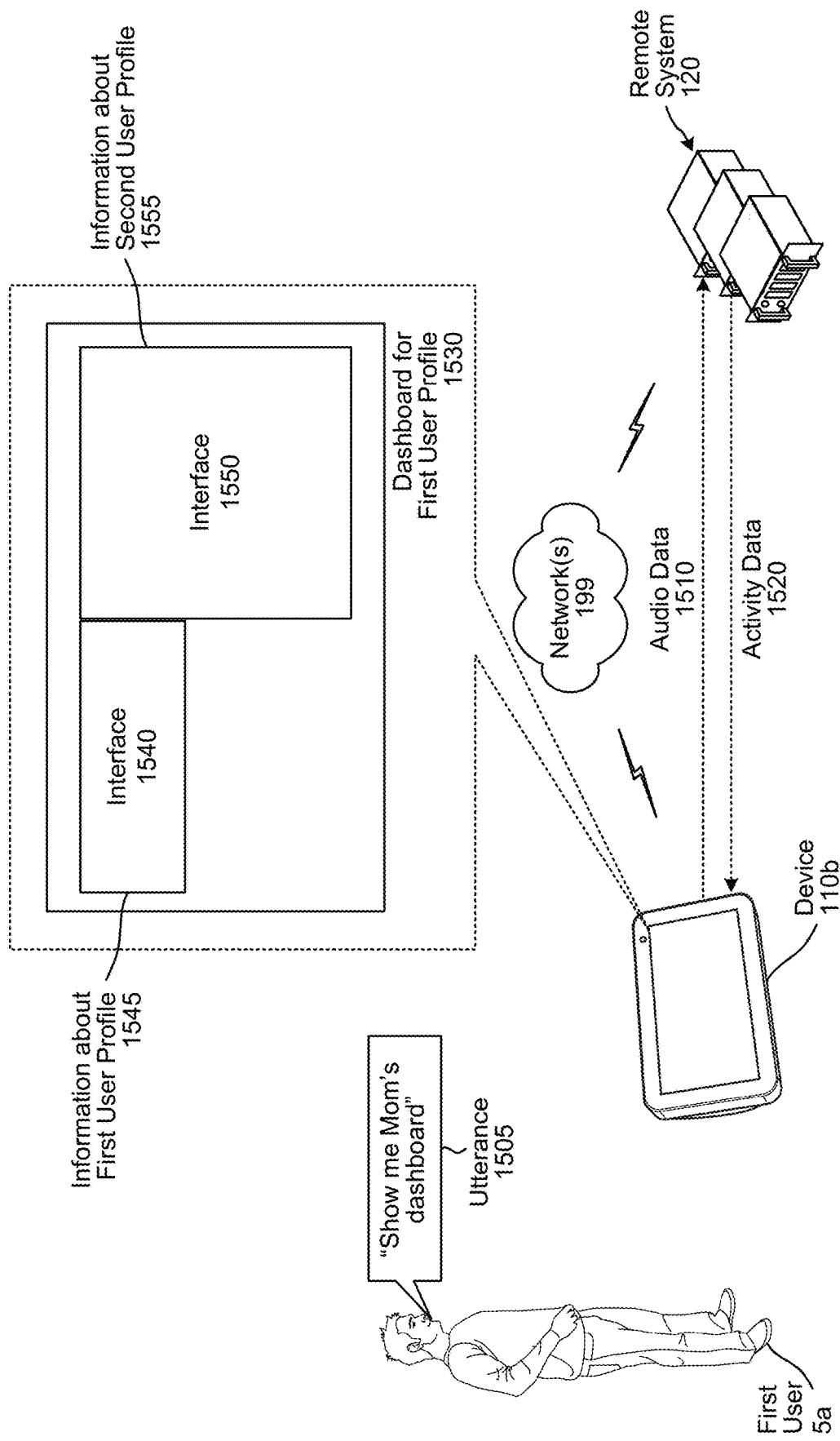

FIGS. 15A-15B illustrate examples of a graphical interface representing a dashboard. For example, FIG. 15A illustrates a dashboard example 1500 in which the second device 110*b* may display a graphical interface corresponding to activity data associated with the second user profile and/or second user account.

As illustrated in FIG. 15A, the first user 5*a* may generate an utterance 1505 (e.g., "Show me Mom's dashboard") requesting that the second device 110*b* display a graphical interface associated with care mode. The second device 110*b* may generate audio data 1510 representing the utterance 1505 and may send the audio data 1510 to the remote system 120 via the network(s) 199. As described above with regard to FIG. 14, the remote system 120 may process the audio data 1510 to determine a command and may send activity data 1520 to the second device 110*b*.

Using the activity data 1520, the second device 110*b* may generate a dashboard 1530 for the first user profile. For example, the dashboard 1530 may include a first interface 1540 representing first information 1545 about the first user profile and a second interface 1550 representing second information 1555 about the second user profile, although the disclosure is not limited thereto. Thus, the second device 110*b* may display the dashboard 1530 to the first user 5*a* as a care mode interface summarizing activity data associated with the second user profile.

While FIG. 15A illustrates an example in which the dashboard 1530 displays information about the first user profile and the second user profile, the disclosure is not limited thereto and the second device 110*b* may display information about multiple user profiles without departing from the disclosure. For example, FIG. 15B illustrates a dashboard example 1560 in which the first user 5*a* may generate an utterance 1565 (e.g., "Show me my care dashboard") requesting that the second device 110*b* display a graphical interface associated with care mode. The second device 110*b* may generate audio data 1570 representing the utterance 1565 and may send the audio data 1570 to the remote system 120 via the network(s) 199. As described above with regard to FIG. 14, the remote system 120 may process the audio data 1570 to determine a command and may send activity data 1575 to the second device 110*b*.

As illustrated in FIG. 15B, the second device 110*b* may generate a dashboard 1580 for the first user profile using the activity data 1575. For example, the dashboard 1580 may include a first interface 1540 representing first information 1545 about the first user profile, a second interface 1550 representing second information 1555 about the second user profile, and a third interface 1590 representing third information 1595 about a third user profile. However, the disclosure is not limited thereto and the dashboard 1580 may include additional interface(s) representing information about additional user profiles without departing from the disclosure. Thus, the second device 110*b* may display the dashboard 1580 to the first user 5*a* as a care mode interface summarizing activity data associated with multiple user profiles.

As used herein, a dashboard may display information about the second user profile, such as a summary of activity with devices 110 associated with the second user profile, information about applications used by the second user 5*b*, information about social interactions using the devices 110, information about human presence detection, and/or the like, although the disclosure is not limited thereto. In some examples, the dashboard may include detailed information about activity that can be filtered using multiple parameters, such as by device, domain, etc. Additionally or alternatively, the dashboard may enable communication between the first user 5*a* and the second user 5*b*, such as by sending message data, image data, and/or the like without departing from the disclosure.

Figure 16:
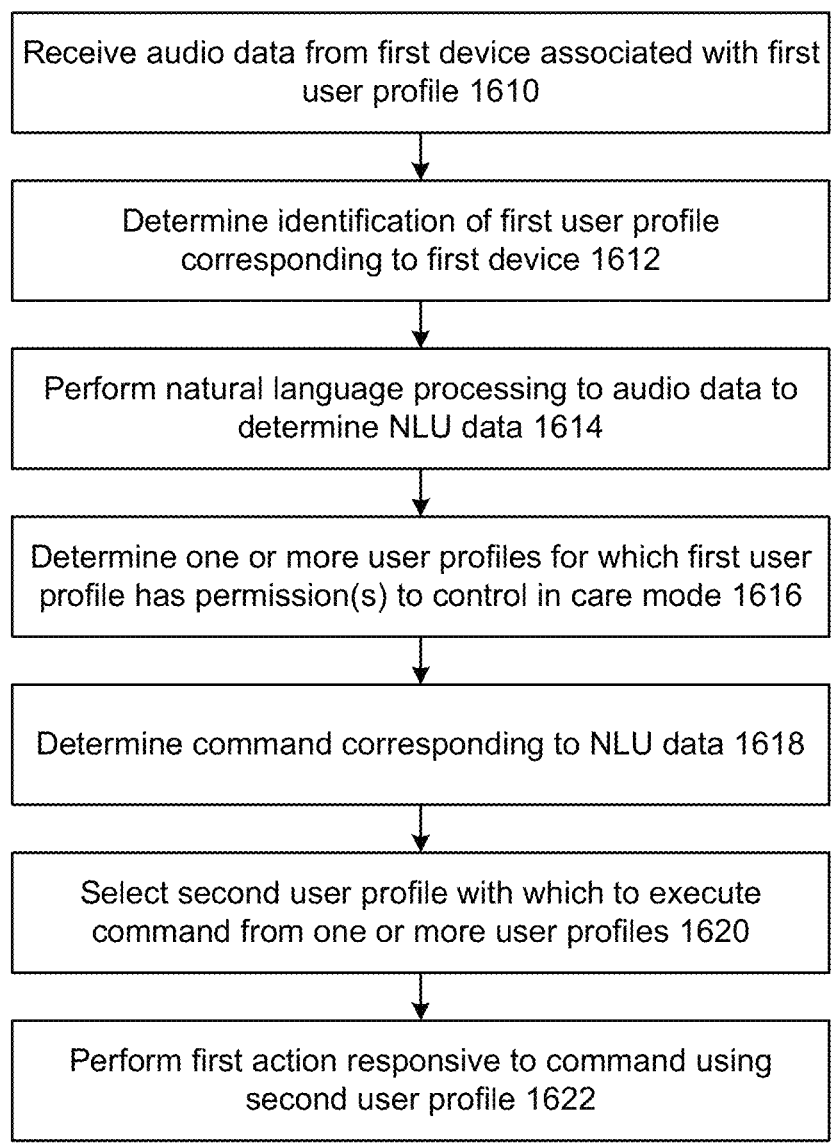
FIG. 16 is a flowchart representing an example method for processing a voice command and identifying an output profile with which to perform an action.

FIG. 16 is a flowchart representing an example method for processing a voice command and identifying an output profile with which to perform an action. As illustrated in FIG. 16, the system 100 may receive (1610) audio data from a first device 110 associated with a first user profile and may determine (1612) an identification of the first user profile corresponding to the first device 110. The system 100 may perform (1614) natural language processing to the audio data to determine NLU data, as described in greater detail below with regard to FIGS. 17-19.

The system 100 may determine (1616) one or more user profiles for which the first user profile has permission(s) to control in care mode. For example, the system 100 may identify any user profile(s) and/or user account(s) for which the first user profile is configured to input commands. The system 100 may determine (1618) a command corresponding to the NLU data, may select (1620) a second user profile with which to execute the command from the one or more user profiles, and may perform (1622) a first action responsive to the command using the second user profile. For example, the system 100 may process the NLU data and/or a list of the one or more user profiles to determine the command and select the second user profile. In some examples, the system 100 may perform step 1620 prior to performing step 1618, although the disclosure is not limited thereto and the system 100 may perform steps 1618-1620 as a single step without departing from the disclosure. Thus, the system 100 enables the first user 5*a* to perform the first action on behalf of the second user 5*b* using a voice command.

Figure 17:
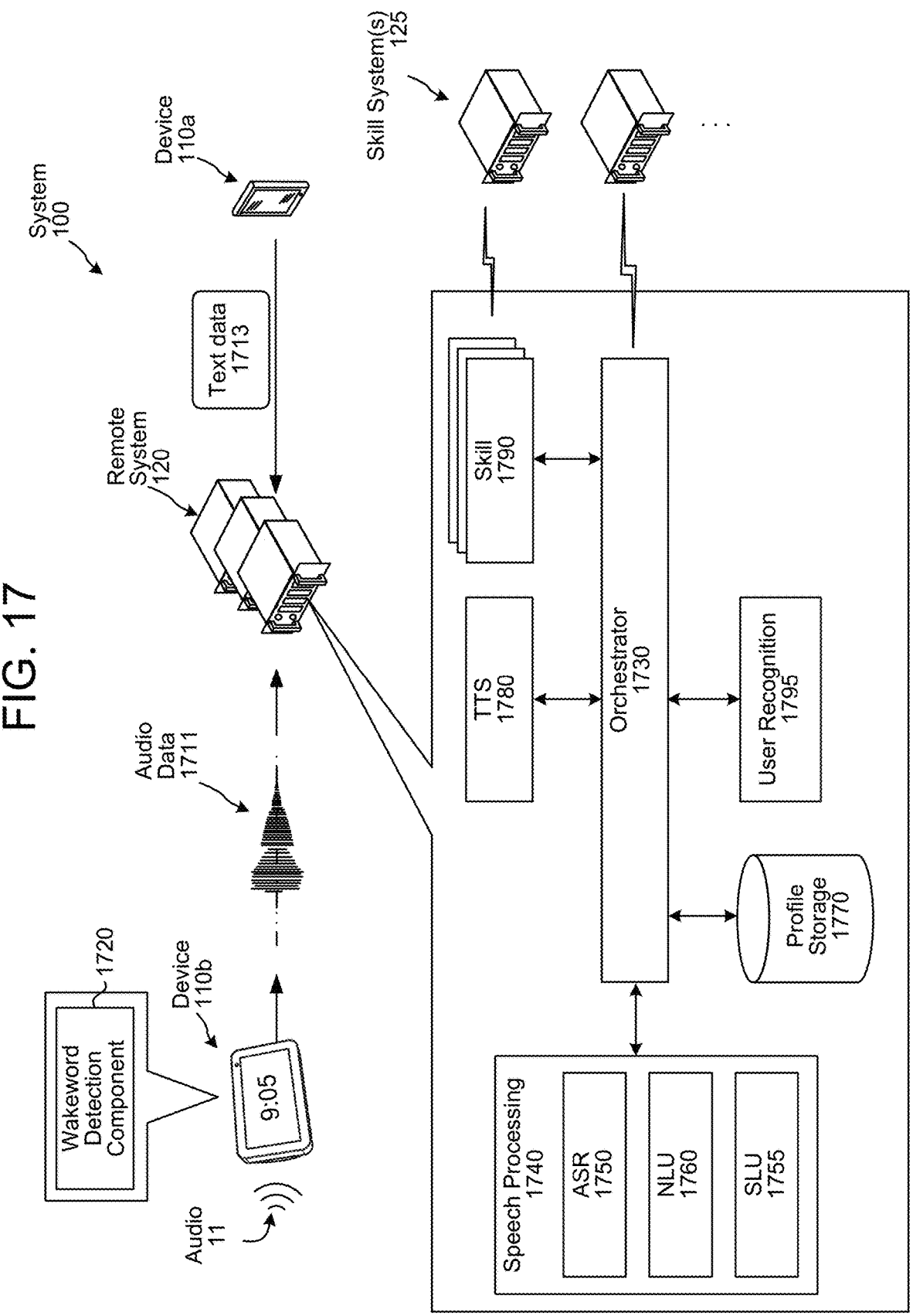
FIG. 17 is a conceptual diagram of components of the system.

The system 100 may operate using various components as described in FIG. 17. The various components may be located on a same or different physical devices. Communication between various components may occur directly or across a network(s) 199.

An audio capture component(s), such as a microphone or array of microphones of the device 110*b*, captures audio 11. The device 110*b* processes audio data, representing the audio 11, to determine whether speech is detected. The device 110*b* may use various techniques to determine whether audio data includes speech. In some examples, the device 110*b* may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110*b* may implement a limited classifier configured to distinguish speech from background noise. The classifier may be implemented by techniques such as linear classifiers, support vector machines, and decision trees. In still other examples, the device 110*b* may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110*b* may use a wakeword detection component 1720 to perform wakeword detection to determine when a user intends to speak an input to the remote system 120. As indicated previously, the device 110*b* may be configured to detect various wakewords, with each wakeword corresponding to a different assistant. In at least some examples, a wakeword may correspond to a name of an assistant. An example wakeword/assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 1720 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1720 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once a wakeword is detected, the device 110*b* may "wake" and begin transmitting audio data 1711, representing the audio 11, to the remote system 120. The audio data 1711 may include data corresponding to the detected wakeword, or the device 110*b* may remove the portion of the audio corresponding to the detected wakeword prior to sending the audio data 1711 to the remote system 120.

The remote system 120 may include an orchestrator component 1730 configured to receive the audio data 1711 (and optionally and assistant identifier) from the device 110*b*. The orchestrator component 1730 may send the audio data 1711 to a speech processing component 1740. In some examples, the speech processing component 1740 may include an ASR component 1750 and an NLU component 1760 that are configured to process the audio data 1711 to generate NLU data (conceptually illustrated in FIGS. 18 and 19, and discussed below). However, the disclosure is not limited thereto and in other examples, the speech processing component 1740 may include a spoken language understanding (SLU) component 1755 that is configured to process the audio data 1711 to generate the NLU data. Additionally or alternatively, the speech processing component 1740 may include the ASR component 1750, the NLU component 1760 and/or the SLU component 1755 without departing from the disclosure.

The ASR component 1750 transcribes the audio data 1711 into ASR results data (e.g., text data) include one or more ASR hypotheses (e.g., in the form of an N-best list). Each ASR hypothesis may represent a different likely interpretation of the speech in the audio data 1711. Each ASR hypothesis may be associated with a score representing a confidence of ASR processing performed to generate the ASR hypothesis with which the score is associated.

The ASR component 1750 interprets the speech in the audio data 1711 based on a similarity between the audio data 1711 and pre-established language models. For example, the ASR component 1750 may compare the audio data 1711 with models for sounds (e.g., subword units, such as phonemes, etc.) and sequences of sounds to identify words that match the sequence of sounds of the speech represented in the audio data 1711.

In some examples, the device 110*a* may receive a typed natural language input. The device 110*a* may generate text data 1713 representing the typed natural language input. The device 110*a* may send the text data 1713 to the remote system 120, wherein the text data 1713 is received by the orchestrator component 1730. However, the disclosure is not limited thereto and in other examples, the device 110*a* may send audio data 1711 to the remote system 120 as described above with regard to device 110*b* without departing from the disclosure.

The orchestrator component 1730 may send text data (e.g., text data output by the ASR component 1750 or the received text data 1713) to an NLU component 1760.

The orchestrator component 1730 (or other component) may also track a dialog and dialog state across multiple utterances. A dialog is an exchange between the user and the system where the user speaks a command and the system executes it. While many dialogs involve a single utterance, many dialogs may involve many different utterances to ultimately execute the action called for by the user. For example, if the user asks the system to order a pizza, the system may invoke a pizza ordering skill and may prompt the user several times for several utterances to obtain the data from the user needed to complete the pizza order (e.g., toppings, time of delivery, any additional items to order, etc.). Another example may be the user invoking a quiz game skill, where multiple questions are asked of the user and the user responds with utterances that are processed by the system and whose text data is sent to the quiz show skill. Each utterance of the dialog may have a unique utterance ID but may also share a common dialog ID so that the system can process incoming audio data knowing that it is associated with a particular dialog.

The remote system 120 may store dialog data indicating the dialog ID and a variety of other information, including input audio data representing an utterance, output audio data representing synthesized speech, first text data corresponding to the utterance, second text data corresponding to the synthesized speech, and/or other information without departing from the disclosure. As used herein, an exchange refers to at least one input and at least one output responsive to the input. Thus, a single exchange may include one or more inputs and one or more outputs, and the dialog may correspond to two or more exchanges without departing from the disclosure. For ease of illustration, an exchange may be referred to as an interaction without departing from the disclosure.

The NLU component 1760 attempts to make a semantic interpretation of the phrase(s) or statement(s) represented in the received text data. That is, the NLU component 1760 determines one or more meanings associated with the phrase(s) or statement(s) represented in the text data based on words represented in the text data. The NLU component 1760 determines an intent representing an action that a user desires be performed as well as pieces of the text data that allow a device (e.g., the device (110a/110b), the remote system 120, a skill system 125, etc.) to execute the intent. For example, if the text data corresponds to "play Adele music," the NLU component 1760 may determine a <PlayMusic> intent and may identify "Adele" as an artist. For further example, if the text data corresponds to "what is the weather," the NLU component 1760 may determine an <OutputWeather> intent. In another example, if the text data corresponds to "turn off the lights," the NLU component 1760 may determine a <DeactivateLight> intent.

The NLU component 1760 may output NLU results data (which may include tagged text data, indicators of intent, etc.) to the orchestrator component 1730. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 1760 in the processing performed to generate the NLU hypothesis associated with the confidence value. Further details of the operation of the NLU component 1760 are described below with reference to FIGS. 18 and 19.

As described above, the remote system 120 may perform speech processing using two different components (e.g., the ASR component 1750 and the NLU component 1760). One skilled in the art will appreciate that the remote system 120, in at least some examples, may implement a spoken language understanding (SLU) component 1755 that is configured to process audio data 1711 to generate NLU results data without departing from the disclosure.

In some examples, the SLU component 1755 may be equivalent to the ASR component 1750 and the NLU component 1760. While the SLU component 1755 may be equivalent to a combination of the ASR component 1750 and the NLU component 1760, the SLU component 1755 may process audio data 1711 and directly generate the NLU results data, without an intermediate step of generating text data (as does the ASR component 1750). As such, the SLU component 1755 may take audio data 1711 representing speech and attempt to make a semantic interpretation of the speech. That is, the SLU component 1755 may determine a meaning associated with the speech and then implement that meaning. For example, the SLU component 1755 may interpret audio data 1711 representing speech from the user 5 in order to derive a desired action. In some examples, the SLU component 1755 outputs a most likely NLU hypothesis, or multiple NLU hypotheses in the form of a lattice or an N-best list with individual NLU hypotheses corresponding to confidence scores or other scores (such as probability scores, etc.).

The orchestrator component 1730 may send the NLU results to an associated skill component 1790. If the NLU results include multiple NLU hypotheses, the orchestrator component 1730 may send a portion of the NLU results corresponding to the top scoring NLU hypothesis to a skill component 1790 associated with the top scoring NLU hypothesis.

A "skill" or "skill component" may be software running on the remote system 120 that is akin to a software application running on a traditional computing device. That is, a skill component 1790 may enable the remote system 120 to execute specific functionality in order to perform one or more actions (e.g., provide information to a user, display content to a user, output music, or perform some other requested action). The remote system 120 may be configured with more than one skill component 1790. For example, a weather skill component may enable the remote system 120 to provide weather information, a ride sharing skill component may enable the remote system 120 to schedule a trip with respect to a ride sharing service, a restaurant skill component may enable the remote system 120 to order food with respect to a restaurant's online ordering system, a communications skill component may enable the system to perform messaging or multi-endpoint communications, etc. A skill component 1790 may operate in conjunction between the remote system 120 and other devices such as the device 110 or skill system(s) 125 in order to complete certain functions. Inputs to a skill component 1790 may come from various interactions and input sources.

The functionality described herein as a skill or skill component may be referred to using many different terms, such as an action, bot, app, application, speechlet or the like. A skill component 1790 may include hardware, software, firmware, or the like that may be dedicated to the particular skill component 1790 or shared among different skill components 1790. A skill component 1790 may be part of the remote system 120 (as illustrated in FIG. 17) or may be located at whole (or in part) with one or more separate systems. Unless expressly stated otherwise, reference to a skill, skill device, or skill component may include a skill component operating within the remote system 120 (for example as skill component 1790) and/or skill component operating within a system separate from the remote system 120.

A skill component 1790 may be configured to perform one or more actions. A skill may enable a skill component 1790 to execute specific functionality in order to provide data or produce some other output requested by a user. A particular skill component 1790 may be configured to execute more than one skill. For example, a weather skill may involve a weather skill component providing weather information to the remote system 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component 1790 may implement different types of skills and may optionally be in communication with one or more skill system(s) 125. The skill system(s) 125 may each correspond to a particular skill component 1790 and may be capable of performing operations to ultimately execute an action. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill. In some instances, skill component(s) 1790 or a skill system(s) 125 may provide output text data responsive to the present user command.

The remote system 120 may communicate with one or more skill systems 125. A skill system 125 may be configured to execute with respect to NLU results data. For example, for NLU results data including a <GetWeather> intent, a weather skill system may determine weather information for a geographic location represented in a user profile or corresponding to a location of the device 110 that captured a corresponding natural language input. For further example, for NLU results data including a <BookRide> intent, a taxi skill system may book a requested ride. In another example, for NLU results data including a <BuyPizza> intent, a restaurant skill system may place an order for a pizza. A skill system 125 may operate in conjunction between the remote system 120 and other devices, such as the device 110, in order to complete certain functions. Inputs to a skill system 125 may come from speech processing interactions or through other interactions or input sources.

A skill system 125 may be associated with a domain. A non-limiting list of illustrative domains includes a smart home domain, a music domain, a video domain, a flash briefing domain, a shopping domain, and/or a custom domain.

The remote system 120 may include a TTS component 1780. The TTS component 1780 may generate audio data (e.g., synthesized speech) from text data using one or more different methods. Text data input to the TTS component 1780 may come from a skill system 125, the orchestrator component 1730, or another component of the system 100.

In one method of synthesis called unit selection, the TTS component 1780 matches text data against a database of recorded speech. The TTS component 1780 selects matching units of recorded speech and concatenates the units together to form audio data. In another method of synthesis called parametric synthesis, the TTS component 1780 varies parameters such as frequency, volume, and noise to generate audio data including an artificial speech waveform. Parametric synthesis uses a computerized voice generator, sometimes called a vocoder.

The remote system 120 may include a user recognition component 1795. In at least some examples, the user recognition component 1795 may be implemented as a skill system 125.

The user recognition component 1795 may recognize one or more users using various data. The user recognition component 1795 may take as input the audio data 1711 and/or the text data 1713. The user recognition component 1795 may perform user recognition (e.g., user recognition processing) by comparing speech characteristics, in the audio data 1711, to stored speech characteristics of users. The user recognition component 1795 may additionally or alternatively perform user recognition by comparing biometric data (e.g., fingerprint data, iris data, etc.), received by the remote system 120 in correlation with a natural language input, to stored biometric data of users. The user recognition component 1795 may additionally or alternatively perform user recognition by comparing image data (e.g., including a representation of at least a feature of a user), received by the remote system 120 in correlation with a natural language input, with stored image data including representations of features of different users. The user recognition component 1795 may perform other or additional user recognition processes, including those known in the art. For a particular natural language input, the user recognition component 1795 may perform processing with respect to stored data of users associated with the device 110 that captured the natural language input.

The user recognition component 1795 determines whether a natural language input originated from a particular user. For example, the user recognition component 1795 may generate a first value representing a likelihood that a natural language input originated from a first user, a second value representing a likelihood that the natural language input originated from a second user, etc. The user recognition component 1795 may also determine an overall confidence regarding the accuracy of user recognition operations.

The user recognition component 1795 may output a single user identifier corresponding to the most likely user that originated the natural language input. Alternatively, the user recognition component 1795 may output multiple user identifiers (e.g., in the form of an N-best list) with respective values representing likelihoods of respective users originating the natural language input. The output of the user recognition component 1795 may be used to inform NLU processing, processing performed by a skill system 125, as well as processing performed by other components of the remote system 120 and/or other systems.

The remote system 120 may include profile storage 1770. The profile storage 1770 may include a variety of information related to individual users, groups of users, devices, etc. that interact with the remote system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information. Data of a profile may additionally or alternatively include information representing a preferred assistant to respond to natural language inputs corresponding to the profile.

The profile storage 1770 may include one or more user profiles. Each user profile may be associated with a different user identifier. Each user profile may include various user identifying information. Each user profile may also include preferences of the user. Each user profile may include one or more device identifiers, representing one or more devices registered to the user. Each user profile may include identifiers of skill systems 125 that the user has enabled. When a user enables a skill system 125, the user is providing the remote system 120 with permission to allow the skill system 125 to execute with respect to the user's natural language inputs. If a user does not enable a skill system 125, the remote system 120 may not invoke the skill system 125 to execute with respect to the user's natural language inputs.

The profile storage 1770 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 1770 may include one or more device profiles. Each device profile may be associated with a different device identifier. A device profile may include various device identifying information. A device profile may also include one or more user identifiers, corresponding to one or more user profiles associated with the device profile. For example, a household device's profile may include the user identifiers of users of the household.

Figure 18:
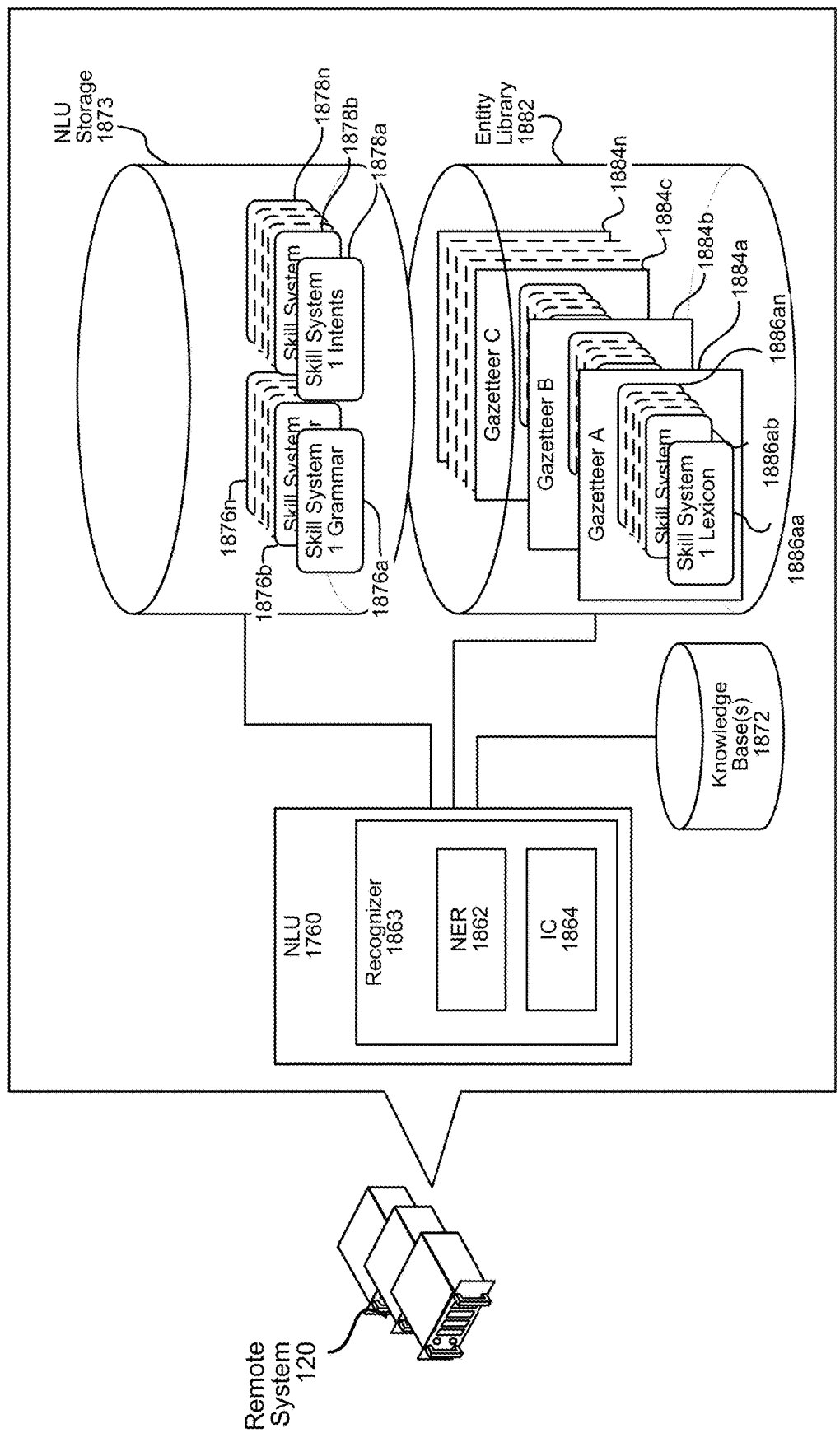
FIG. 18 is a conceptual diagram of how natural language processing is performed.

FIG. 18 is a conceptual diagram showing how natural language processing is performed by the NLU component 1760, according to embodiments of the present disclosure.

The NLU component 1760 may include one or more recognizers 1863. In at least some embodiments, a recognizer 1863 may be associated with a skill system 125 (e.g., the recognizer may be configured to interpret text data to correspond to the skill system 125). In at least some other examples, a recognizer 1863 may be associated with a domain (i.e., the recognizer may be configured to interpret text data to correspond to the domain). The recognizer 1863 can serve as a search provider interface to the skills and/or domains such as a music domain.

Recognizers 1863 may process text data in parallel, in series, partially in parallel, etc. For example, a recognizer corresponding to a first domain may process text data at least partially in parallel to a recognizer corresponding to a second domain. For further example, a recognizer corresponding to a first skill system may process text data at least partially in parallel to a recognizer corresponding to a second skill system. Thus, the system 100 can fan out searches related to entity recognition and resolution across the recognizers 1863.

The NLU component 1760 may communicate with various storages. The NLU component 1760 may communicate with an NLU storage 1873, which includes skill system grammars (1876a-1876n), representing how natural language inputs may be formulated to invoke skill systems 125, and skill system intents (1878a-1878n) representing intents supported by respective skill systems 125.

Each recognizer 1863 may be associated with a particular grammar 1876, a particular intent(s) 1878, and a particular personalized lexicon 1886 (stored in an entity library 1882). A gazetteer 1884 may include skill system-indexed lexical information associated with a particular user. For example, Gazetteer A (1884a) may include skill system-indexed lexical information 1886aa to 1886an. A user's music skill system lexical information might include album titles, artist names, and song names, for example, whereas a user's contact list skill system lexical information might include the names of contacts. Since every user's music collection and contact list is presumably different, this personalized information may improve entity resolution.

Each recognizer 1863 may include a named entity recognition (NER) component 1862 that attempts to identify grammars and lexical information that may be used to construe meaning with respect to text data input therein. A NER component 1862 identifies portions of text data that correspond to a named entity that may be recognizable by the remote system 120. A NER component 1862 may also determine whether a word refers to an entity that is not explicitly mentioned in the text, for example "him," "her," "it" or other anaphora, exophora or the like.

A NER component 1862 applies grammar models 1876 and lexical information 1886 associated with one or more skill systems 125 to determine a mention of one or more entities in text data input therein. In this manner, a NER component 1862 identifies "slots" (i.e., particular words in text data) that may be needed for later processing. A NER component 1862 may also label each slot with a type (e.g., noun, place, city, artist name, song name, etc.).

Each grammar model 1876 may include the names of entities (i.e., nouns) commonly found in speech about a particular skill system 125 to which the grammar model 1876 relates, whereas lexical information 1886 may be personalized to the user identifier output by a user recognition component 1795 (described herein with reference to FIG. 17) for the natural language input. For example, a grammar model 1876 associated with a shopping skill system may include a database of words commonly used when people discuss shopping.

A downstream process called named entity resolution actually links a portion of text data (identified by a NER component 1862) to a specific entity known to the remote system 120. To perform named entity resolution, the NLU component 1760 may use gazetteer information (1884a-1884n) stored in the entity library storage 1882. The gazetteer information 1884 may be used to match text data (identified by a NER component 1862) with different entities, such as song titles, contact names, etc. Gazetteers may be linked to users (e.g., a particular gazetteer may be associated with a specific user's music collection), may be linked to certain skill systems 125 (e.g., a shopping skill system, a music skill system, a video skill system, a communications skill system, etc.), or may be organized in another manner.

Each recognizer 1863 may also include an IC component 1864 that processes text data input thereto to determine an intent(s) of a skill system(s) 125 that potentially corresponds to the natural language input represented in the text data. An intent corresponds to an action to be performed that is responsive to the natural language input represented by the text data. An IC component 1864 may communicate with a database 1878 of words linked to intents. For example, a music intent database may link words and phrases such as "quiet," "volume off," and "mute" to a <Mute> intent. An IC component 1864 identifies potential intents by comparing words and phrases in text data to the words and phrases in an intents database 1878 associated with the skill system(s) 125 that is associated with the recognizer 1863 implementing the IC component 1864.

The intents identifiable by a specific IC component 1864 may be linked to one or more skill system-specific grammar frameworks 1876 with "slots" to be filled. Each slot of a grammar framework 1876 corresponds to a portion of text data that a NER component 1862 believes corresponds to an entity. For example, a grammar framework 1876 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 1876 may not be structured as sentences, but rather based on associating slots with grammatical tags.

For example, a NER component 1862 may identify words in text data as subject, object, verb, preposition, etc. based on grammar rules and/or models prior to recognizing named entities in the text data. An IC component 1864 (implemented by the same recognizer 1863) may use the identified verb to identify an intent. The NER component 1862 may then determine a grammar model 1876 associated with the identified intent. For example, a grammar model 1876 for an intent corresponding to <PlayMusic> may specify a list of slots applicable to play the identified "object" and any object modifier (e.g., a prepositional phrase), such as {Artist Name}, {Album Name}, {Song name}, etc. The NER component 1862 may then search corresponding fields in a lexicon 1886, attempting to match words and phrases in the text data the NER component 1862 previously tagged as a grammatical object or object modifier with those identified in the lexicon 1886.

A NER component 1862 may perform semantic tagging, which is the labeling of a word or combination of words according to their type/semantic meaning. A NER component 1862 may parse text data using heuristic grammar rules, or a model may be constructed using techniques such as hidden Markov models, maximum entropy models, log linear models, conditional random fields (CRF), and the like. For example, a NER component 1862, implemented by a music skill system or music domain recognizer 1863, may parse and tag text data corresponding to "play mother's little helper by the rolling stones" as {Verb}: "Play," {Object}: "mother's little helper," {Object Preposition}: "by," and {Object Modifier}: "the rolling stones." The NER component 1862 may identify "Play" as a verb based on a word database associated with the music skill system or music domain, which an IC component 1864 may determine corresponds to a <PlayMusic> intent. At this stage, no determination has been made as to the meaning of "mother's little helper" and "the rolling stones," but based on grammar rules and models, the NER component 1862 has determined that the text of these phrases relates to the grammatical object (i.e., entity).

The frameworks linked to the intent are then used to determine what database fields should be searched to determine the meaning of these phrases, such as searching a user's gazetteer 1884 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 1884 does not resolve a slot/field using gazetteer information, the NER component 1862 may search a database of generic words (in the knowledge base 1872). For example, if the text data corresponds to "play songs by the rolling stones," after failing to determine an album name or song name called "songs" by "the rolling stones," the NER component 1862 may search a music skill system vocabulary for the word "songs." In the alternative, generic words may be checked before the gazetteer information, or both may be tried, potentially producing two different results.

A recognizer 1863 may tag text data to attribute meaning thereto. For example, a recognizer 1863 may tag "play mother's little helper by the rolling stones" as: {skill system} Music, {intent} Play Music, {artist name} rolling stones, {media type} SONG, and {song title} mother's little helper. For further example, a recognizer 1863 may tag "play songs by the rolling stones" as: {skill system} Music, {intent} Play Music, {artist name} rolling stones, and {media type} SONG.

As described above, more than one recognizer 1863 may process with respect to text data representing a single natural language input. In such examples, each recognizer 1863 may output at least one NLU hypothesis including an intent indicator (determined by an IC component 1864 of the recognizer 1863) and at least one tagged named entity (determined by a NER component 1862 of the recognizer 1863).

Figure 19:
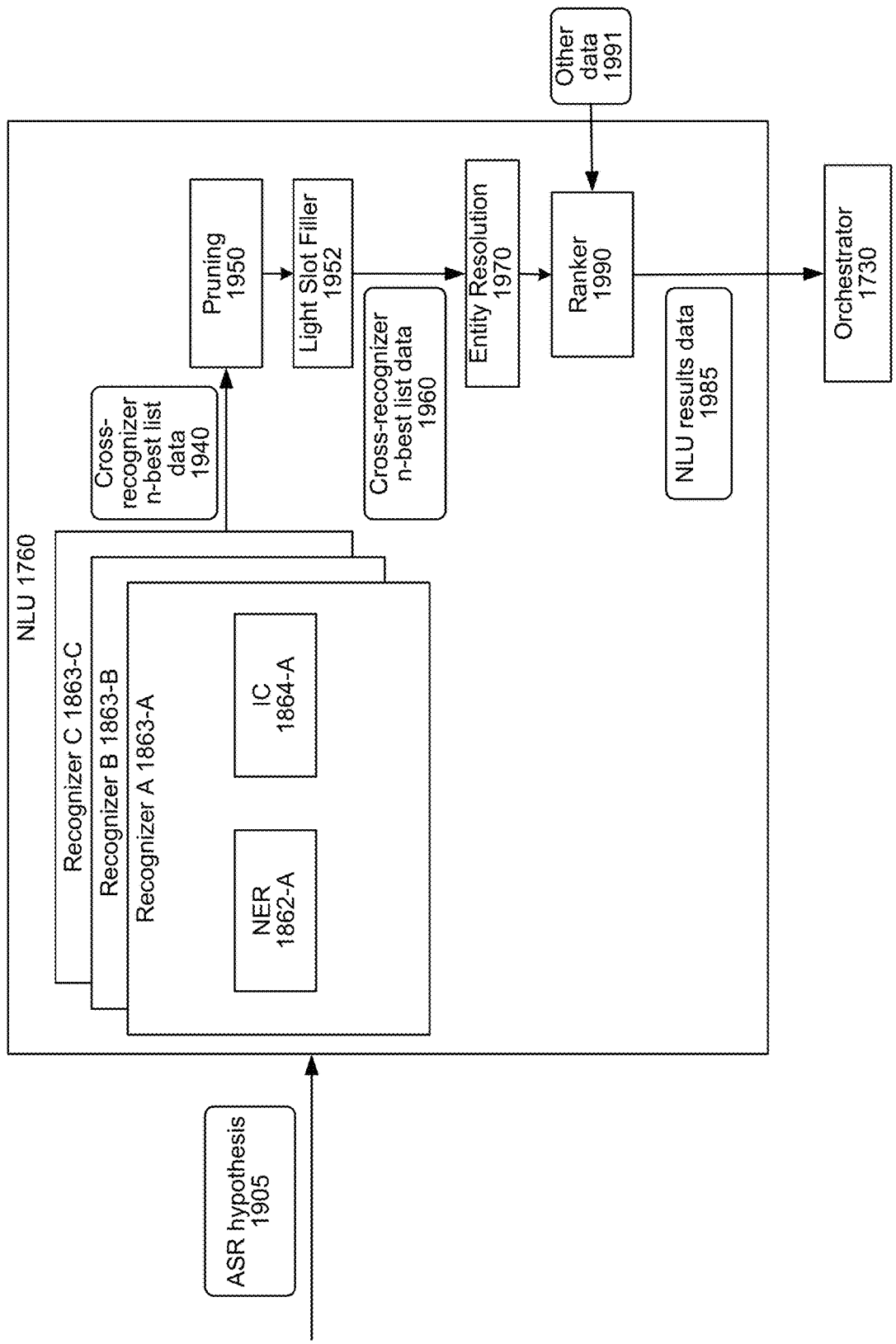
FIG. 19 is a conceptual diagram of how natural language processing is performed.

FIG. 19 is a conceptual diagram of how natural language processing is performed by the NLU component 1760, according to embodiments of the present disclosure. As described above, the ASR component 1750 can transcribe audio data into one or more ASR hypotheses 1905 embodied in ASR output data (e.g., one or more different textual or symbolic representations of the speech contained in the audio data 1711). The ASR output data can include a ranked list of ASR hypotheses or the top-scoring ASR hypothesis when multiple ASR hypotheses are generated for a single natural language input. A top-scoring ASR hypothesis (and/ or other ASR hypotheses), which includes the text or symbolic data corresponding to the most likely transcription of the audio data may be sent from the ASR component 1750 to the orchestrator 1730 and from the orchestrator 1730 to the NLU component 1760.

The NLU component 1760 can receive one or more ASR hypotheses 1905 from the orchestrator 1730. The NLU component 1760 can interpret the one or more ASR hypotheses 1905 to determine one or more NLU hypotheses embodied in NLU results data 1985 (e.g., one or more different intents and entities contained in the transcription of the audio data 1711). The NLU results data 1985 can include a ranked list of NLU hypotheses or the top-scoring NLU hypothesis when multiple NLU hypotheses are generated for a single natural language input. A top-scoring NLU hypothesis (and/or other NLU hypotheses), which includes the intent and entity data corresponding to the most likely interpretation of the audio data 1711 may be sent from the NLU component 1760 to the orchestrator 1730.

As illustrated in FIG. 19, the NLU component 1760 may receive an ASR hypothesis 1905 from the ASR component 1750 and may compile the NLU hypotheses (output by multiple recognizers 1863) into cross-recognizer N-best list data 1940. Each NLU hypothesis may be associated with a respective score indicating a likelihood that the NLU hypothesis corresponds to the domain, one or more skill systems 125 associated with the recognizer 1863 from which the NLU hypothesis was output. For example, the cross-recognizer N-best list data 1940 may be represented as:

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface with each line of the foregoing corresponding to a different NLU hypothesis and associated score.

The NLU component 1760 may send the cross-recognizer N-best list data 1940 to a pruning component 1950, which sorts the NLU hypotheses, represented in the cross-recognizer N-best list data 1940, according to their respective scores. The pruning component 1950 may then perform score thresholding with respect to the cross-recognizer N-best list data 1940. For example, the pruning component 1950 may select NLU hypotheses, represented in the cross-recognizer N-best list data 1940, associated with scores satisfying (e.g., meeting and/or exceeding) a threshold score. The pruning component 1950 may additionally or alternatively perform number of NLU hypothesis thresholding. For example, the pruning component 1950 may select a threshold number of top-scoring NLU hypotheses represented in the cross-recognizer N-best list data 1940.

The pruning component 1950 may generate cross-recognizer N-best list data 1960 including the selected NLU hypotheses. The purpose of the pruning component 1950 is to create a reduced list of NLU hypotheses so that downstream, more resource intensive, processes may only operate on NLU hypotheses that most likely represent the natural language input.

The NLU component 1760 may include a light slot filler component 1952 that takes text from slots, represented in the NLU hypotheses output by the pruning component 1950, and alter it to make the text more easily processed by downstream components. The light slot filler component 1952 may perform low latency operations that do not involve heavy operations such as reference to a knowledge base. The purpose of the light slot filler component 1952 is to replace words with other words or values that may be more easily understood by downstream components. For example, if a NLU hypothesis includes the word "tomorrow," the light slot filler component 1952 may replace the word "tomorrow" with an actual date for purposes of downstream processing. Similarly, the light slot filler component 1952 may replace the word "CD" with "album" or the words "compact disc." The replaced words are then included in the cross-recognizer N-best list data 1960.

The cross-recognizer N-best list data 1960 may be sent to an entity resolution component 1970. The entity resolution component 1970 can apply rules or other instructions to standardize labels or tokens in the NLU hypotheses represented in the cross-recognizer N-best list data 1960. The precise transformation may depend on the skill system 125, domain, etc., to which a NLU hypothesis relates. For example, for a travel skill system-specific NLU hypothesis, the entity resolution component 1970 may transform text corresponding to "Boston airport" to the standard BOS three-letter code referring to the airport. The entity resolution component 1970 can refer to a knowledge base that is used to specifically identify the precise entity referred to in each slot of each NLU hypothesis represented in the cross-recognizer N-best list data 1960.

Specific intent/slot combinations may also be tied to a particular source, which may then be used to resolve the text. In the example "play songs by the stones," the entity resolution component 1970 may reference a personal music catalog, Amazon Music account, a user profile, or the like. The entity resolution component 1970 may output N-best list data, altered from the cross-recognizer N-best list data 1960, that includes more detailed information (e.g., entity IDs) about the specific entities mentioned in the slots and/or more detailed slot data that can eventually be used by a skill system 125 to perform an action responsive to the natural language input. The NLU component 1760 may include multiple entity resolution components 1970 that are each specific to one or more different skill systems 125, domains, etc.

One or more models for the entity resolution component 1970 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The NLU component 1760 may include a ranker component 1990 that assigns a particular score to each NLU hypothesis input therein. The score of a particular NLU hypothesis may be affected by whether the NLU hypothesis has unfilled slots. For example, if a first NLU hypothesis includes slots that are all filled/resolved, the ranker component 1990 may assign the first NLU hypothesis a higher score than a second NLU hypothesis including at least one slot that is unfilled/unresolved by the entity resolution component 1970.

The ranker component 1990 may apply re-scoring, biasing, or other techniques. To do so, the ranker component 1990 may consider not only the data output by the entity resolution component 1970, but may also consider other data 1991. The other data 1991 may include a variety of information.

For example, the other data 1991 may include skill system 125 rating or popularity data. For example, if a skill system 125 has a high rating, the ranker component 1990 may increase the score of a NLU hypothesis associated with that skill system 125, and vice versa.

The other data 1991 may additionally or alternatively include information about skill systems 125 that have been enabled by the user that originated the natural language input. For example, the ranker component 1990 may assign higher scores to NLU hypotheses associated with enabled skill systems 125 than NLU hypotheses associated with skill systems 125 that have not been enabled by the user.

The other data 1991 may additionally or alternatively include data indicating system usage history (e.g., specific to the user), such as if the user, that originated the natural language input, regularly invokes a particular skill system 125 or does so at particular times of day. The other data 1991 may additionally or alternatively include data indicating date, time, location, weather, type of device 110, user identifier, context, as well as other information. For example, the ranker component 1990 may consider when any particular skill system 125 is currently active with respect to the present user and/or device 110 (e.g., music being output by the skill system 125, a game being executed by the skill system 125, etc.).

The ranker component 1990 may output NLU results data 1985 including one or more NLU hypotheses. The NLU component 1760 may send the NLU results data 1985 to the orchestrator 1730.

Figure 20:
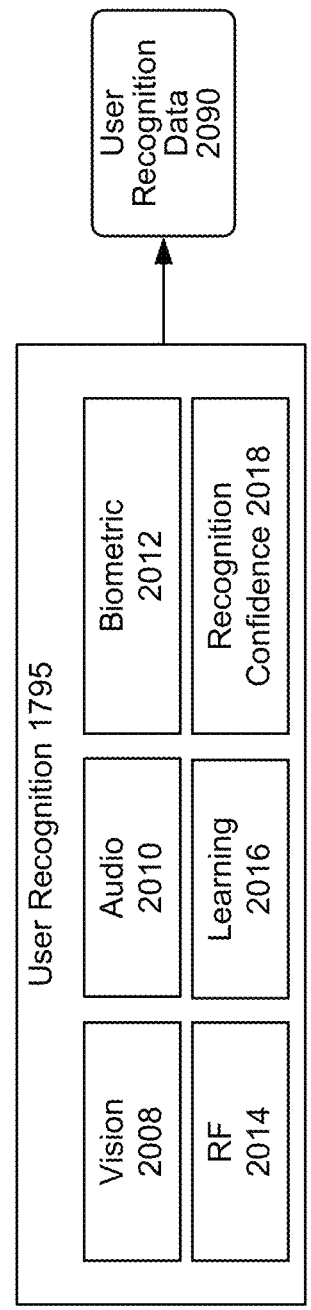
FIG. 20 is a schematic diagram of an illustrative architecture in which sensor data is combined to recognize one or more users.

FIG. 20 is a schematic diagram of an illustrative architecture in which sensor data is combined to recognize one or more users, in accordance with embodiments of the present disclosure. As described above, the remote system 120 may include a user recognition component 1795. The user recognition component 1795 may recognize one or more users using a variety of data. However, the disclosure is not limited thereto, and the user recognition component 1795 may be included within an individual device 110 without departing from the disclosure. Thus, the device(s) 110 and/or the remote system 120 may perform user recognition processing without departing from the disclosure.

As illustrated in FIG. 20, the user recognition component 1795 may include one or more subcomponents including a vision component 2008, an audio component 2010, a biometric component 2012, a radio frequency (RF) component 2014, a learning component 2016, and a recognition confidence component 2018. In some instances, the user recognition component 1795 may monitor data and determinations from one or more subcomponents to recognize an identity of one or more users associated with data input to the remote system 120. The user recognition component 1795 may output user recognition data 2090, which may include a user identifier associated with a user the user recognition component 1795 believes originated data input to the remote system 120. The user recognition component 1795 may be used to inform processes performed by various components of the remote system 120 as described herein.

The vision component 2008 may receive data from one or more sensors capable of providing images (e.g., cameras) or sensors indicating motion (e.g., motion sensors). The vision component 2008 can perform facial recognition or image analysis to determine an identity of a user and to associate that identity with a user profile associated with the user. In some instances, when a user is facing a camera, the vision component 2008 may perform facial recognition and identify the user with a high degree of confidence. In other instances, the vision component 2008 may have a low degree of confidence of an identity of a user, and the user recognition component 1795 may use determinations from additional components to determine an identity of a user. The vision component 2008 can be used in conjunction with other components to determine an identity of a user. For example, the user recognition component 1795 may use data from the vision component 2008 with data from the audio component 2010 to identify what user's face appears to be speaking at the same time audio is captured by a device 110 the user is facing for purposes of identifying a user who spoke an input to the remote system 120.

The overall system of the present disclosure may include biometric sensors that transmit data to the biometric component 2012. For example, the biometric component 2012 may receive data corresponding to fingerprints, iris or retina scans, thermal scans, weights of users, a size of a user, pressure (e.g., within floor sensors), etc., and may determine a biometric profile corresponding to a user. The biometric component 2012 may distinguish between a user and sound from a television, for example. Thus, the biometric component 2012 may incorporate biometric information into a confidence level for determining an identity of a user. Biometric information output by the biometric component 2012 can be associated with specific user profile data such that the biometric information uniquely identifies a user profile of a user.

The RF component 2014 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 2014 the strength of the signal (e.g., as a received signal strength indication (RSSI)). The RF component 2014 may use the RSSI to determine an identity of a user (with an associated confidence level). In some instances, the RF component 2014 may determine that a received RF signal is associated with a mobile device that is associated with a particular user identifier.

In some instances, a device 110 may include some RF or other detection processing capabilities so that a user who speaks an input may scan, tap, or otherwise acknowledge the user's personal device (such as a phone) to the device 110. In this manner, the user may "register" with the remote system 120 for purposes of the remote system 120 determining who spoke a particular input. Such a registration may occur prior to, during, or after speaking of an input.

The learning component 2016 may track the behavior of various users as a factor in determining a confidence level of the identity of the user. By way of example, a user may adhere to a regular schedule such that the user is at a first location during the day (e.g., at work or at school). In this example, the learning component 2016 would factor in past behavior and/or trends in determining the identity of the user that provided input to the remote system 120. Thus, the learning component 2016 may use historical data and/or usage patterns over time to increase or decrease a confidence level of an identity of a user.

In at least some instances, the recognition confidence component 2018 receives determinations from the various components 2008, 2010, 2012, 2014, and 2016, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 1795.

The audio component 2010 may receive data from one or more sensors capable of providing an audio signal (e.g., one or more microphones) to facilitate recognition of a user. The audio component 2010 may perform audio recognition on an audio signal to determine an identity of the user and associated user identifier. In some instances, aspects of the remote system 120 may be configured at a computing device (e.g., a local server). Thus, in some instances, the audio component 2010 operating on a computing device may analyze all sound to facilitate recognition of a user. In some instances, the audio component 2010 may perform voice recognition (e.g., voice recognition processing) to determine an identity of a user.

The audio component 2010 may also perform user identification based on audio data 1711 input into the remote system 120 for speech processing. The audio component 2010 may determine scores indicating whether speech in the audio data 1711 originated from particular users. For example, a first score may indicate a likelihood that speech in the audio data 1711 originated from a first user associated with a first user identifier, a second score may indicate a likelihood that speech in the audio data 1711 originated from a second user associated with a second user identifier, etc. The audio component 2010 may perform user recognition by comparing speech characteristics represented in the audio data 1711 to stored speech characteristics of users (e.g., stored voice profiles associated with the device 110 that captured the spoken user input).

Figure 21:
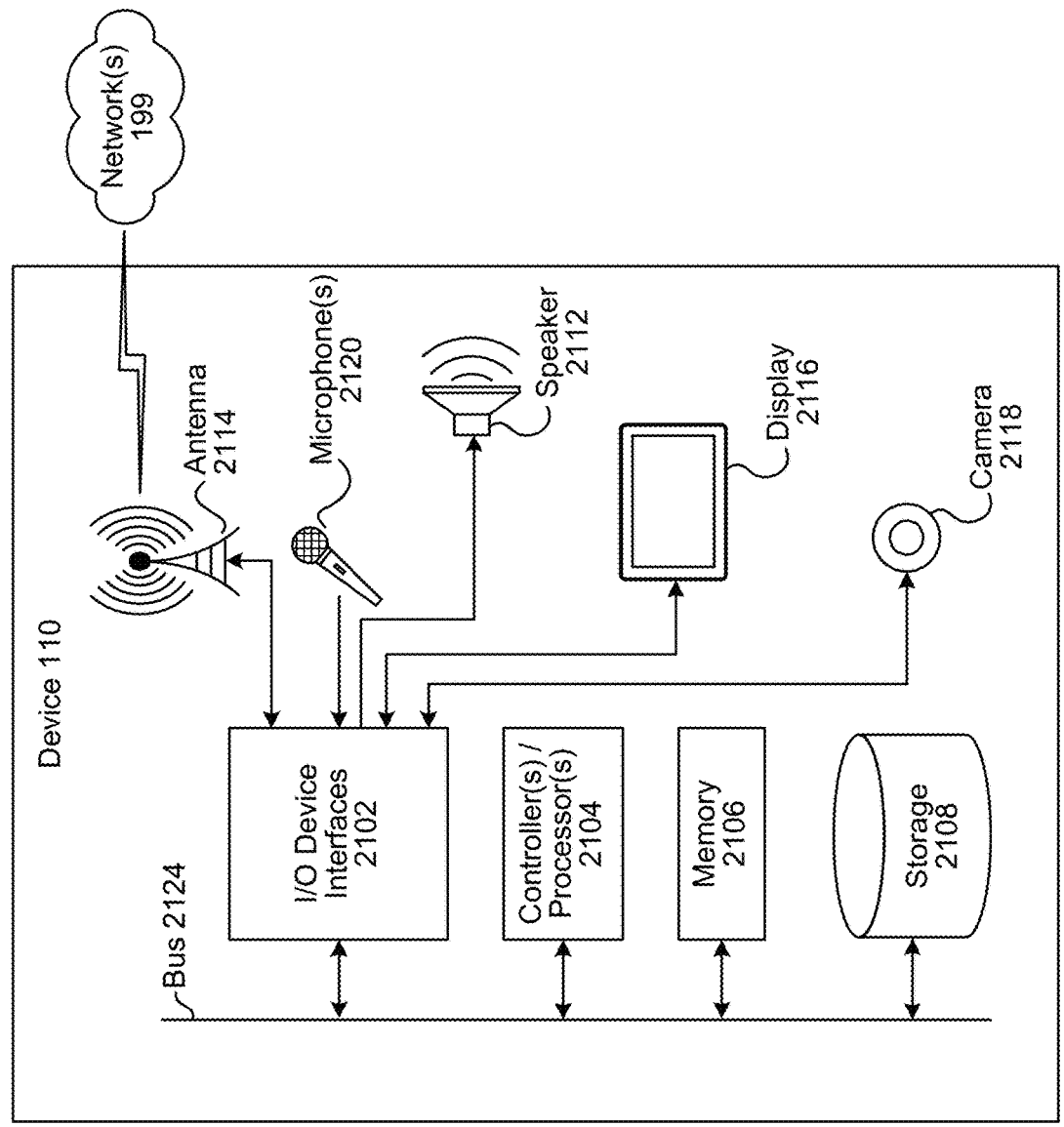
FIG. 21 is a block diagram conceptually illustrating example components of a device.

FIG. 21 is a block diagram conceptually illustrating a device 110 that may be used with the system. FIG. 22 is a block diagram conceptually illustrating example components of a remote device, such as the natural language processing remote system 120, which may assist with ASR processing, NLU processing, etc.; and skill system(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (2104/2204), which may each include a central processing unit (CPU) for processing data and computer-readable instructions, and a memory (2106/2206) for storing data and instructions of the respective device. The memories (2106/2206) may individually include volatile random access memory (RAM), non-volatile read only memory (ROM), non-volatile magnetoresistive memory (MRAM), and/or other types of memory. Each device (110/120/125) may also include a data storage component (2108/2208) for storing data and controller/processor-executable instructions. Each data storage component (2108/2208) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (2102/2202).

Computer instructions for operating each device (110/120/125) and its various components may be executed by the respective device's controller(s)/processor(s) (2104/2204), using the memory (2106/2206) as temporary "working" storage at runtime. A device's computer instructions may be stored in a non-transitory manner in non-volatile memory (2106/2206), storage (2108/2208), or an external device(s). Alternatively, some or all of the executable instructions may be embedded in hardware or firmware on the respective device in addition to or instead of software.

Each device (110/120/125) includes input/output device interfaces (2102/2202). A variety of components may be connected through the input/output device interfaces (2102/2202), as will be discussed further below. Additionally, each device (110/120/125) may include an address/data bus (2124/2224) for conveying data among components of the respective device. Each component within a device (110/120/125) may also be directly connected to other components in addition to (or instead of) being connected to other components across the bus (2124/2224).

Referring to FIG. 21, the device 110 may include input/output device interfaces 2102 that connect to a variety of components such as an audio output component such as a speaker 2112, a wired headset or a wireless headset (not illustrated), or other component capable of outputting audio. The device 110 may also include an audio capture component. The audio capture component may be, for example, a microphone 2120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 2116 for displaying content. The device 110 may further include a camera 2118.

Via antenna(s) 2114, the input/output device interfaces 2102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (2102/2202) may also include communication components that allow data to be exchanged between devices such as different physical servers in a collection of servers or other components.

The components of the device 110, the natural language processing remote system 120, and/or skill system(s) 125 may include their own dedicated processors, memory, and/or storage. Alternatively, one or more of the components of the device 110, the natural language processing remote system 120, and/or skill system(s) 125 may utilize the I/O interfaces (2102/2202), processor(s) (2104/2204), memory (2106/2206), and/or storage (2108/2208) of the device(s) 110, natural language processing remote system 120, or the skill system(s) 125, respectively. Thus, the ASR component 1750 may have its own I/O interface(s), processor(s), memory, and/or storage; the NLU component 1760 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language processing remote system 120, and skill system(s) 125, as described herein, are illustrative, and may be located as a stand-alone device or may be included, in whole or in part, as a component of a larger device or system.

Multiple devices 110, the remote system 120, the skill system(s) 125, and/or other components may be connected over a network(s) 199. The network(s) 199 may include a local or private network or may include a wide network such as the Internet. Devices may be connected to the network(s) 199 through either wired or wireless connections. For example, the devices 110 may be connected to the network(s) 199 through a wireless service provider, over a WiFi or cellular network connection, or the like. Other devices are included as network-connected support devices, such as the natural language processing remote system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 1750, the NLU component 1760, etc. of the natural language processing remote system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
    associating, by a first device associated with a first user account and operating a user interface, a first plurality of resources with the first user account;
    receiving, by the first device, first data indicating that a second user account is associated with the first device;
    associating, by the first device, a second plurality of resources with the second user account;
    receiving, by the first device, while the first device is associated with the first user account and the second user account, second data indicating a first input to the first device;
    processing the second data to determine a first command;
    determining that the first command is to be executed as though the first command originated from the second user account;
    determining that the second user account grants permission to the first user account to initiate the first command on behalf of the second user account;
    using the second plurality of resources, causing a first action to be performed that is responsive to the first command, the first action performed as though the first command originated from the second user account;
    receiving, by the first device, while the first device is associated with the first user account and the second user account, third data indicating a second input to the first device;
    processing the third data to determine a second command;
    determining that the second command is to be executed as though the second command originated from the first user account; and
    using the first plurality of resources, causing a second action to be performed that is responsive to the second command, the second action performed as though the second command originated from the first user account.

2. The computer-implemented method of claim 1, further comprising:
    associating, prior to receiving the first data, a first process with the first plurality of resources;
    receiving the first data indicating that the second user account is associated with the first device; and
    associating the first process with the second plurality of resources.

3. The computer-implemented method of claim 1, further comprising:
    receiving, from a remote device, activity data associated with the second user account;
    determining fourth data associated with the first user account; and
    generating, by the first device, a user interface representing the activity data and the fourth data.

4. The computer-implemented method of claim 1, further comprising:
    generating, by the first device, first audio data representing an utterance;
    sending the first audio data to a natural language system for processing;
    sending an indication that the first device is in a first mode in which the first device is associated with the first user account and the second user account; and causing a third action to be performed that is responsive to the utterance, the third action performed as though the first audio data originated from the second user account.

5. A computer-implemented method, the method comprising:
receiving, by a first device associated with a first user account and operating a user interface, first data indicating association of a second user account to the first device;
receiving, by the first device, while the first device is associated with the first user account and the second user account, second data indicating a first input to the first device;
processing the second data to determine a first command;
determining that the first command is to be executed as though the first command originated from the second user account;
determining that the second user account indicates that the first user account is permitted to initiate the first command on behalf of the second user account;
performing, by the first device, a first action responsive to the first command as though the first command originated from the second user account;
receiving, by the first device, while the first device is associated with the first user account and the second user account, third data indicating a second input to the first device;
processing the third data to determine a second command;
determining that the second command is to be executed as though the second command originated from the first user account; and
performing, by the first device, a second action responsive to the second command as though the second command originated from the first user account.

6. The computer-implemented method of claim 5, further comprising:
associating, prior to receiving the first data, a first process with the first user account;
receiving the first data indicating association of the second user account to the first device; and
associating the first process with the second user account.

7. The computer-implemented method of claim 5, further comprising:
associating a first process with the first user account;
associating a second process with a first user profile of the first user account;
receiving fourth data instructing the first device to switch from the first user profile to a second user profile of the first user account; and
associating the second process with the second user profile.

8. The computer-implemented method of claim 5, further comprising:
associating, by the first device prior to receiving the first data, a first plurality of resources with the first user account;
in response to receiving the first data, associating, by the first device, a second plurality of resources with the second user account;
using the second plurality of resources, performing the first action responsive to the first command as though the first command originated from the second user account; and
using the first plurality of resources, performing the second action responsive to the second command as though the second command originated from the first user account.

9. The computer-implemented method of claim 5, further comprising:
associating, by the first device prior to receiving the first data, a first plurality of resources with the first user account;
associating, by the first device prior to receiving the first data, a second plurality of resources with a first user profile of the first user account;
in response to receiving the first data, associating, by the first device, a third plurality of resources with the second user account; and
in response to receiving the first data, associating, by the first device, a fourth plurality of resources with a second user profile of the second user account.

10. The computer-implemented method of claim 5, further comprising:
receiving, from a remote device, activity data associated with the second user account;
determining fourth data associated with the first user account; and
generating a user interface representing the activity data and the fourth data.

11. The computer-implemented method of claim 5, further comprising:
generating first audio data;
sending the first audio data to a second device; and
sending an indication that the first device is in a first mode in which the first device is associated with the first user account and the second user account.

12. The computer-implemented method of claim 5, further comprising:
determining a first identifier corresponding to a process;
identifying a plurality of resources corresponding to the first identifier;
selecting a first resource of the plurality of resources; and
determining fourth data associated with the first resource and the first identifier.

13. A system comprising:
at least one processor; and
memory including instructions operable to be executed by the at least one processor to cause the system to:
receive, by a first device associated with a first user account and operating a user interface, first data indicating association of a second user account to the first device;
receive, by the first device, while the first device is associated with the first user account and the second user account, second data indicating a first input to the first device;
process the second data to determine a first command;
determine that the first command is to be executed as though the first command originated from the second user account;
determine that the second user account indicates that the first user account is permitted to initiate the first command on behalf of the second user account;
perform, by the first device, a first action responsive to the first command as though the first command originated from the second user account;
receive, by the first device, while the first device is associated with the first user account and the second user account, third data indicating a second input to the first device;

process the third data to determine a second command;

determine that the second command is to be executed as though the second command originated from the first user account; and perform, by the first device, a second action responsive to the second command as though the second command originated from the first user account.

14. The system of claim 13, wherein the memory further comprises instructions that, when executed by the at least one processor, further cause the system to:

associate, prior to receiving the first data, a first process with the first user account;

receive the first data indicating association of the second user account to the first device; and associate the first process with the second user account.

15. The system of claim 13, wherein the memory further comprises instructions that, when executed by the at least one processor, further cause the system to:

associate a first process with the first user account;

associate a second process with a first user profile of the first user account;

receive fourth data instructing the first device to switch from the first user profile to a second user profile of the first user account; and associate the second process with the second user profile.

16. The system of claim 13, wherein the memory further comprises instructions that, when executed by the at least one processor, further cause the system to:

associate, by the first device prior to receiving the first data, a first plurality of resources with the first user account;

in response to receiving the first data, associate, by the first device, a second plurality of resources with the second user account;

using the second plurality of resources, perform the first action responsive to the first command as though the first command originated from the second user account; and using the first plurality of resources, perform the second action responsive to the second command as though the second command originated from the first user account.

17. The system of claim 13, wherein the memory further comprises instructions that, when executed by the at least one processor, further cause the system to:

associate, by the first device prior to receiving the first data, a first plurality of resources with the first user account;

associate, by the first device prior to receiving the first data, a second plurality of resources with a first user profile of the first user account;

in response to receiving the first data, associate, by the first device, a third plurality of resources with the second user account; and in response to receiving the first data, associate, by the first device, a fourth plurality of resources with a second user profile of the second user account.

18. The system of claim 13, wherein the memory further comprises instructions that, when executed by the at least one processor, further cause the system to:

receive, from a remote device, activity data associated with the second user account;

determine fourth data associated with the first user account; and generate a user interface representing the activity data and the fourth data.

19. The system of claim 13, wherein the memory further comprises instructions that, when executed by the at least one processor, further cause the system to:

generate first audio data;

send the first audio data to a second device; and send an indication that the first device is in a first mode in which the first device is associated with the first user account and the second user account.

20. The system of claim 13, wherein the memory further comprises instructions that, when executed by the at least one processor, further cause the system to:

determine a first identifier corresponding to a process;

identify a plurality of resources corresponding to the first identifier;

select a first resource of the plurality of resources; and determine fourth data associated with the first resource and the first identifier.

* * * * *